US009889393B2

(12) United States Patent
Nakagawa et al.

(10) Patent No.: US 9,889,393 B2
(45) Date of Patent: Feb. 13, 2018

(54) FILTRATION APPARATUS

(75) Inventors: Koichi Nakagawa, Komatsushima (JP);
Kosuke Tsuda, Tokushima (JP)

(73) Assignee: AWA PAPER MFG. CO., LTD.,
Tokushima (JP)

(*) Notice: Subject to any disclaimer, the term of this patent is extended or adjusted under 35 U.S.C. 154(b) by 789 days.

(21) Appl. No.: 13/978,807

(22) PCT Filed: Jan. 14, 2011

(86) PCT No.: PCT/JP2011/050557
§ 371 (c)(1),
(2), (4) Date: Jul. 9, 2013

(87) PCT Pub. No.: WO2012/095992
PCT Pub. Date: Jul. 19, 2012

(65) Prior Publication Data
US 2013/0284655 A1    Oct. 31, 2013

(51) Int. Cl.
*B01D 29/00* (2006.01)
*B01D 29/39* (2006.01)
(Continued)

(52) U.S. Cl.
CPC ............ *B01D 25/04* (2013.01); *B01D 29/39* (2013.01); *B01D 29/41* (2013.01); *B01D 63/082* (2013.01);
(Continued)

(58) Field of Classification Search
CPC ...... B01D 29/41; B01D 29/111; B01D 29/39; B01D 29/395; B01D 29/072; B01D 29/13;
(Continued)

(56) References Cited

U.S. PATENT DOCUMENTS 1,836,308 A    2/1928  Bull
1,721,250 A *  7/1929  Greenhalgh ........... B01D 25/02
                                                  210/346
(Continued)

FOREIGN PATENT DOCUMENTS

DE        23 59 709           7/1975
DE      WO03074160      *    9/2003
(Continued)

OTHER PUBLICATIONS

English language machine translation of WO-03-074160, 10 pages, No Date.*
(Continued)

*Primary Examiner* — Pranav Patel
(74) *Attorney, Agent, or Firm* — Wenderoth, Lind & Ponack, L.L.P.

(57) ABSTRACT

A plurality of hollow filter sheets have a suction pipe inserted therethrough to be stacked with a ring-shaped packing clamped therebetween. Therefore, a gap between the hollow filter sheet and the suction pipe is watertightly sealed. In the hollow filter sheet, a hollow portion is provided between two filters, and then a spacer with a surface having pits and projections is provided in the hollow portion. A narrow passage space allowing liquid to pass through is provided between the filter and the spacer by pressing the two filters against surfaces of the spacer with the packings and causing the filters to be deformed into a shape according to the surfaces of the spacer. The narrow passage space is smaller than a drainage space between the filters and the spacer that are not clamped by the packings.

21 Claims, 27 Drawing Sheets

(51) Int. Cl.
  B01D 63/08 (2006.01)
  B01D 65/00 (2006.01)
  C02F 1/44 (2006.01)
  B01D 29/41 (2006.01)

(52) U.S. Cl.
  CPC .............. B01D 65/003 (2013.01); C02F 1/44 (2013.01); B01D 2313/06 (2013.01); B01D 2313/125 (2013.01); B01D 2315/06 (2013.01)

(58) Field of Classification Search
  CPC ........ B01D 29/15; B01D 29/96; B01D 29/43; B01D 61/08; B01D 61/18; B01D 61/28; B01D 63/081; B01D 63/082; B01D 63/084; B01D 2313/04; B01D 2313/06; B01D 2313/14; B01D 2313/21; B01D 2313/23; B01D 2315/06; B01D 2319/04; C02F 1/44; C02F 1/444; C02F 1/441; C02F 3/1273
  See application file for complete search history.

(56) References Cited

U.S. PATENT DOCUMENTS 5,225,080 A * 7/1993 Karbachsch ......... B01D 25/001
                                             210/321.75
2004/0007527 A1 * 1/2004 Pedersen ............ B01D 61/142
                                             210/650
2006/0086654 A1   4/2006 Voigt et al.
2007/0095743 A1 * 5/2007 Grodecki ............... B01D 29/39
                                             210/346

FOREIGN PATENT DOCUMENTS

| | | | |
|---|---|---|---|
| JP | 8-24593 | | 1/1996 |
| JP | H09-075965 | * | 3/1997 |
| JP | 2010-29818 | | 2/2010 |
| WO | 03/074160 | | 9/2003 |
| WO | 2006/045440 | | 5/2006 |

OTHER PUBLICATIONS

English language machine translation of JPH09-075965, 13 pages, No Date.*

Extended European Search Report dated Jul. 23, 2014 in corresponding European patent application No. 11855667.9.

International Search Report dated Apr. 26, 2011 in International Application No. PCT/JP2011/050557.

* cited by examiner

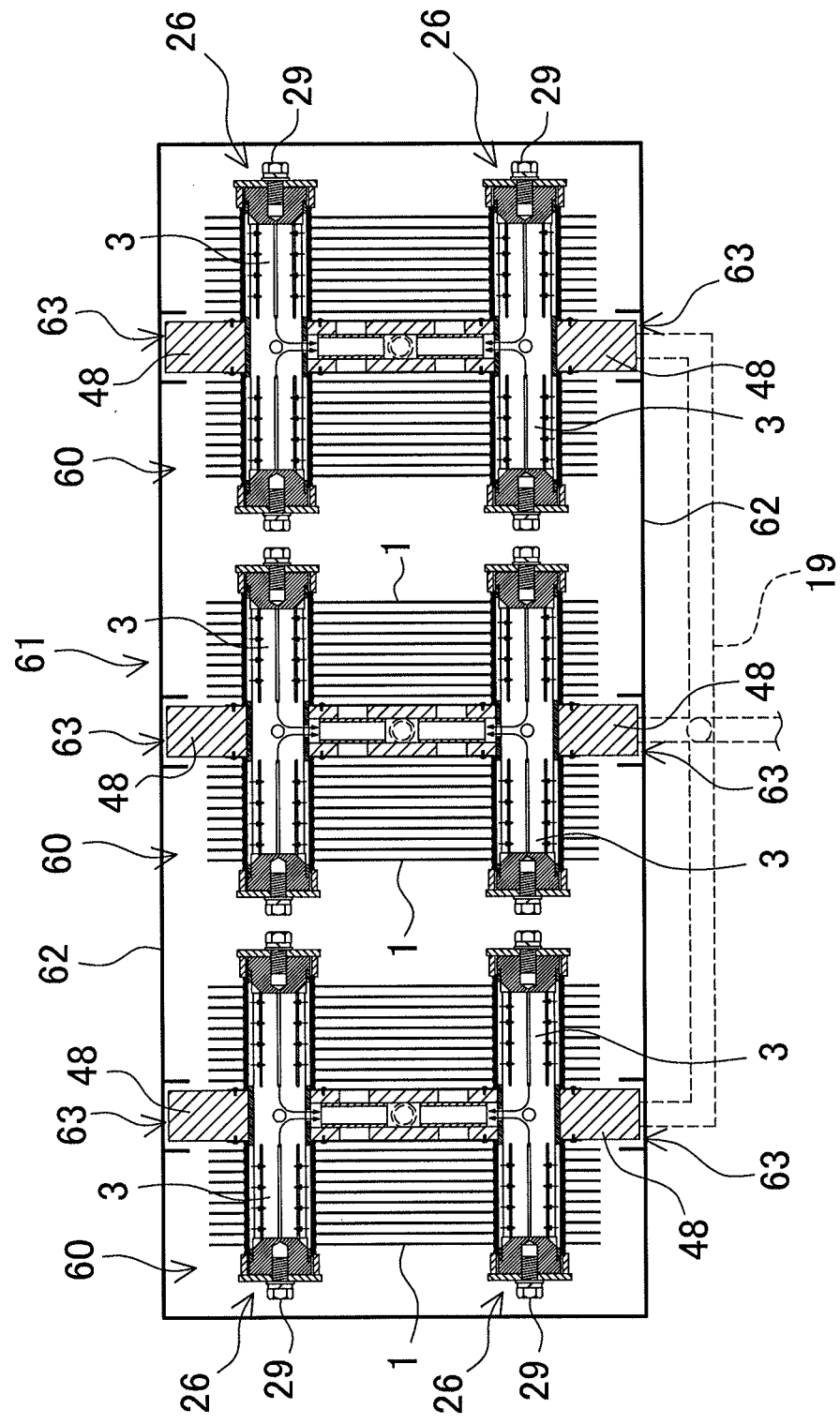

FILTRATION APPARATUS

BACKGROUND OF THE INVENTION

1. Field of the Invention

The present invention relates to a filtration apparatus in which a filtration area is increased by stacking a plurality of hollow filter sheets.

2. Description of the Related Art

A filtration apparatus has been developed in which a plurality of hollow filter sheets are stacked and then a suction pipe is inserted through through holes provided in the hollow filter sheets, followed by sucking liquid penetrating the hollow filter sheets with the suction pipe.

See WO 2006/045440

As shown in FIGS. 1 and 2, in a filtration apparatus disclosed in WO 2006/045440, two suction pipes 93 are inserted through central portions on both sides of a plurality of stacked hollow filter sheets 91. FIG. 3 is a sectional view showing a part of the hollow filter sheets 91 through which the suction pipe 93 is inserted. As shown in the figure, the suction pipe 93 is connected to central portions 91A inside the hollow filter sheets 91 to suck liquid from the central portions 91A. The suction pipe 93 includes a plurality of connection pipes 94.

The above filtration apparatus can increase a filtration capacity by increasing a surface area of the hollow filter sheet. Unfortunately, the filtration apparatus with such a structure cannot be used when a part of the hollow filter sheet is damaged. This is because non-filtered liquid penetrates the damaged part of the hollow filter sheet, leading to failure in filtration of turbid water, sludge or the like.

An apparatus employing a large number of hollow fibers has been developed as a filtration apparatus. This filtration apparatus can be used even when any of the hollow fibers is damaged. This is because, even when any of the hollow fibers is damaged, an extremely thin inside becomes clogged with a filtered object, thereby blocking passage of the liquid. However, hair or fibers are easily deposited on the hollow fibers, and further, the hollow fibers are vulnerable to a high-concentration operation. The hollow fibers are disadvantageously vulnerable to dirt compared with the hollow filter sheet.

The present invention has been developed in order to solve the above problems. An important object of the present invention is to provide a filtration apparatus employing a hollow filter sheet, which can be used even when a part of the hollow filter sheet is damaged, that is, having excellent characteristics of both of the filtration apparatus with the hollow filter sheets and the filtration apparatus with the hollow fibers.

SUMMARY OF THE INVENTION

A filtration apparatus of the present invention includes: a plurality of hollow filter sheets each obtained by stacking two filters and connecting outer peripheral edges thereof; and a suction pipe extending through the plurality of hollow filter sheets and connected to a hollow portion of each hollow filter sheet. The filtration apparatus filters liquid by transferring, from the hollow portion of the hollow filter sheet to the suction pipe, liquid penetrating from an outside of the hollow filter sheet to an inside of the hollow portion. The suction pipe includes a suction hole connected to the hollow portion of the hollow filter sheet. The hollow filter sheet includes a through hole through which the suction pipe is inserted, the through holes having the suction pipe inserted therethrough, thereby connecting the plurality of hollow filter sheets to the suction pipe in a stacked manner. Further, a ring-shaped packing is clamped between the stacked follow filter sheets having the suction pipe inserted therethrough, the ring-shaped packing having an inner shape allowing the suction pipe to be inserted therethrough and an outer shape longer than an inner shape of the through hole of the hollow filter sheet, the ring-shaped packing watertightly sealing a gap between the hollow filter sheet and the suction pipe. The hollow filter sheet is provided with the hollow portion between the two filters, the hollow portion being provided with a spacer with a surface having pits and projections. A narrow passage space allowing liquid to pass through is provided between the filter and the spacer by pressing the two filters against surfaces of the spacer with the ring-shaped packings and causing the filters to be deformed into a shape according to the surfaces of the spacer, the narrow passage space being smaller than a drainage space between the filters and the spacer that are not clamped by the ring-shaped packings.

The above filtration apparatus employs the hollow filter sheet, which can be used even when a part of the hollow filter sheet is damaged. The reason is described as follows. In the filtration apparatus, the plurality of hollow filter sheets each obtained by providing the spacer with the surface having pits and projections between the two filters are clamped by the packings, and have the suction pipe inserted therethrough, followed by being stacked. Then, the gap between the hollow filter sheet and the suction pipe is watertightly sealed with the packing. Further, the narrow passage space allowing liquid to pass through is provided between the filter and the spacer by pressing the two filters of the hollow filter sheet against the surfaces of the spacer with the packings. The narrow passage space is smaller than a drainage space between the filters and the spacer that are not clamped by the packings. As for this filtration apparatus, even when a part of the hollow filter sheet is damaged, causing non-filtered liquid to enter the inside of the hollow filter sheet from this damaged part, filtered objects in the liquid are blocked by the narrow passage spaces formed between the filters and the spacer. Therefore, the filtered objects are prevented from flowing into the suction pipe. Accordingly, this filtration apparatus employs the hollow filter sheet, and even when a part of the hollow filter sheet is damaged, turbid water and sludge entering from this damaged part can be effectively prevented from entering the suction pipe and being discharged.

In the filtration apparatus of the present invention, the spacer may be any one of a net or a plate with a surface having pits and projections.

In the above filtration apparatus, a size of the narrow passage space between the filter and the spacer can be ideally adjusted by adjusting the pits and projections on the surface of the spacer. In particular, as for the filtration apparatus employing the net as the spacer, production cost can be reduced by using an inexpensive net, as well as the size of the pits and projections on the surface of the spacer can be easily adjusted by adjusting a thickness and mesh of linear members of the net. As for the filtration apparatus employing the plate with the surface having pits and projections as the spacer, the pits and projections on the surface of the spacer can be easily adjusted by variously adjusting a shape, a size, an interval, the number or the like of the pits and projections on the surface of the plate.

In the filtration apparatus of the present invention, mesh of the net of the spacer may be 40 to 150.

In the filtration apparatus of the present invention, the packing may be a rubber elastic body.

In the above filtration apparatus, the two filters of the hollow filter sheet are ideally pressed against the surfaces of the spacer by an elastic force of the packing of the rubber elastic body, thereby providing the narrow passage space between the filter and the spacer.

In the filtration apparatus of the present invention, the filter may be a flexible sheet obtained by providing a filtration membrane on a surface of a nonwoven fabric.

In the above filtration apparatus, the filter is pressed against the surface of the spacer with the ring-shaped packing to cause the filter of the flexible sheet to be deformed into a shape according to the surface of the spacer, thereby providing the narrow passage space.

In the filtration apparatus of the present invention, a thickness of the spacer not being compressed may be 0.2 to 1 mm.

In the filtration apparatus of the present invention, a pressing force with respect to a unit length in a circumferential direction at the time of the ring-shaped packing pressing a surface of the filter may be 1 to 6 kgf/cm.

In the filtration apparatus of the present invention, the packing may be an O-ring with a circular cross section, or a ring with a quadrilateral cross section.

The above and further objects of the present invention as well as the features thereof will become more apparent from the following detailed description to be made in conjunction with the accompanying drawings.

BRIEF DESCRIPTION OF THE DRAWINGS

FIG. 28 is a sectional view showing one example of the filtration apparatus in FIG. 25 in use.

DETAILED DESCRIPTION OF THE EMBODIMENT(S)

Figure 1:
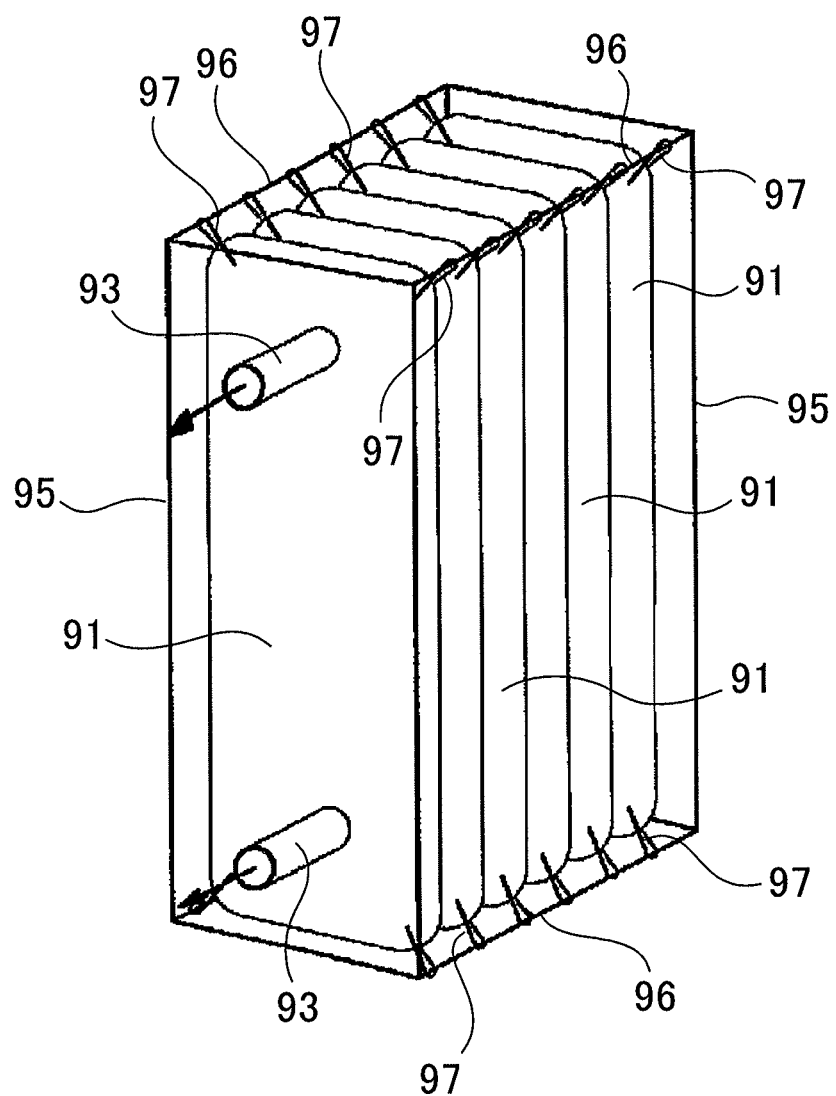
FIG. 1 is a schematic perspective view of a conventional filtration apparatus.
Figure 2:
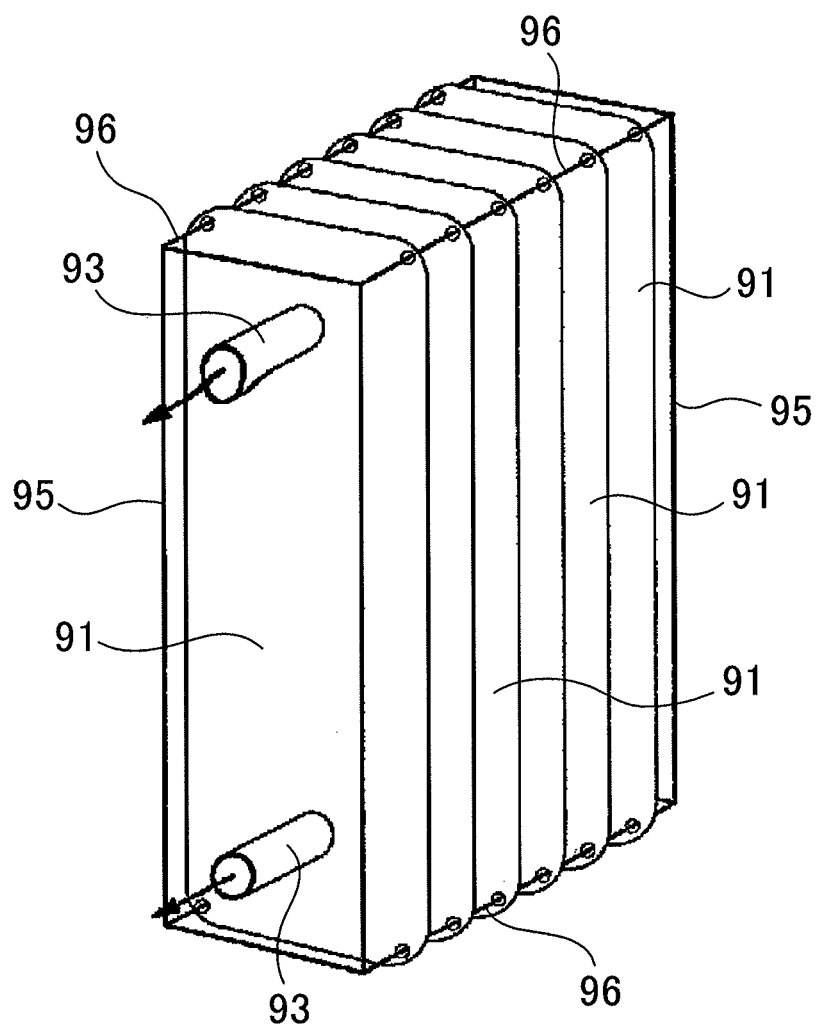
FIG. 2 is a schematic perspective view of another conventional filtration apparatus.
Figure 3:
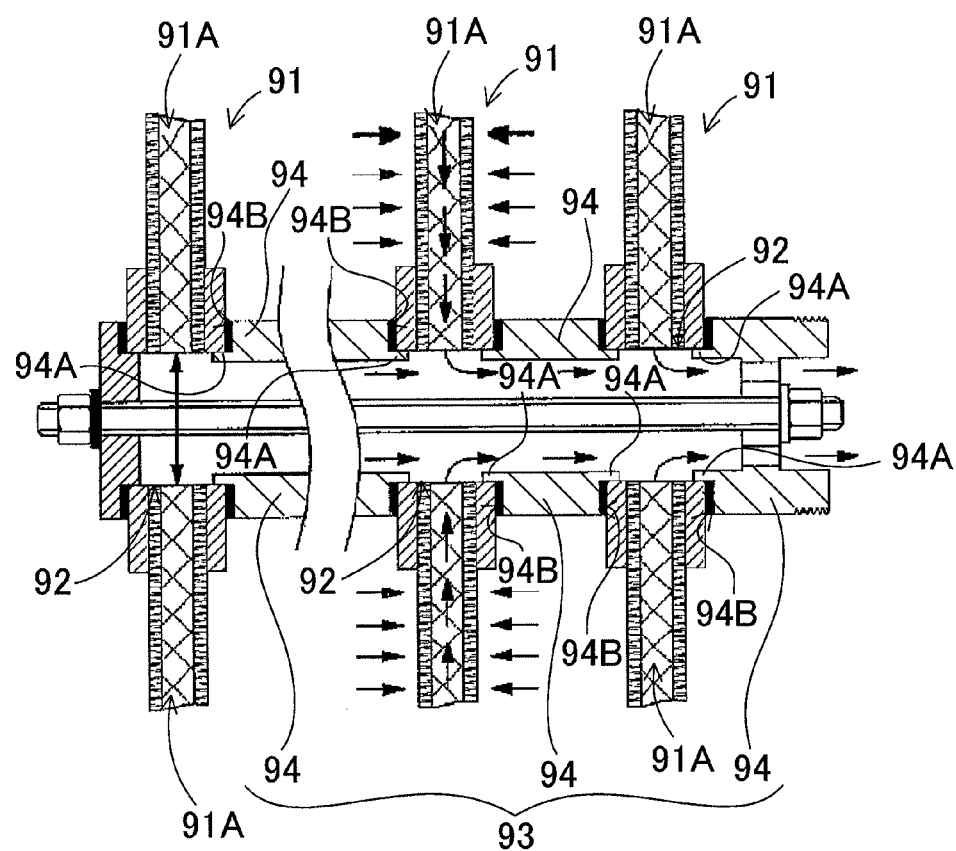
FIG. 3 is an enlarged sectional view showing how the filtration apparatus in FIG. 1 is used.

Hereinafter, an embodiment of the present invention will be described with reference to the drawings. The embodiment described below is deemed to be merely illustrative of a filtration apparatus for giving a concrete form to the technical idea of the present invention, and therefore, the present invention does not limit the filtration apparatus to the following. Further, in the description, reference numerals corresponding to components in the embodiment are given to components in "CLAIMS" and "SOLUTION TO PROBLEM" for facilitating the understanding of CLAIMS. However, the components in CLAIMS are never limited to the components in the embodiment.

Figure 4:
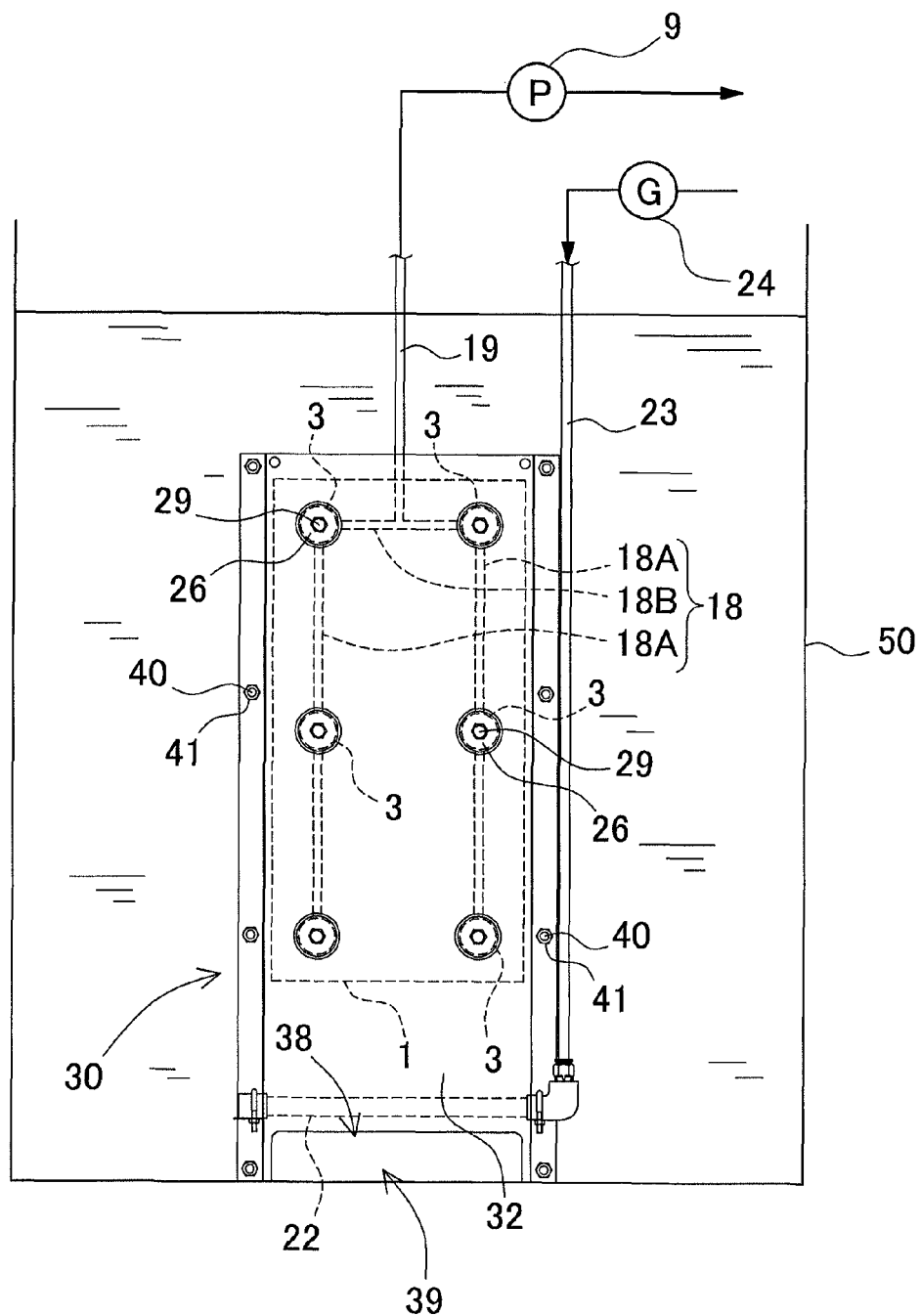
FIG. 4 is a schematic sectional view showing how a filtration apparatus according to an embodiment of the present invention is used.
Figure 5:
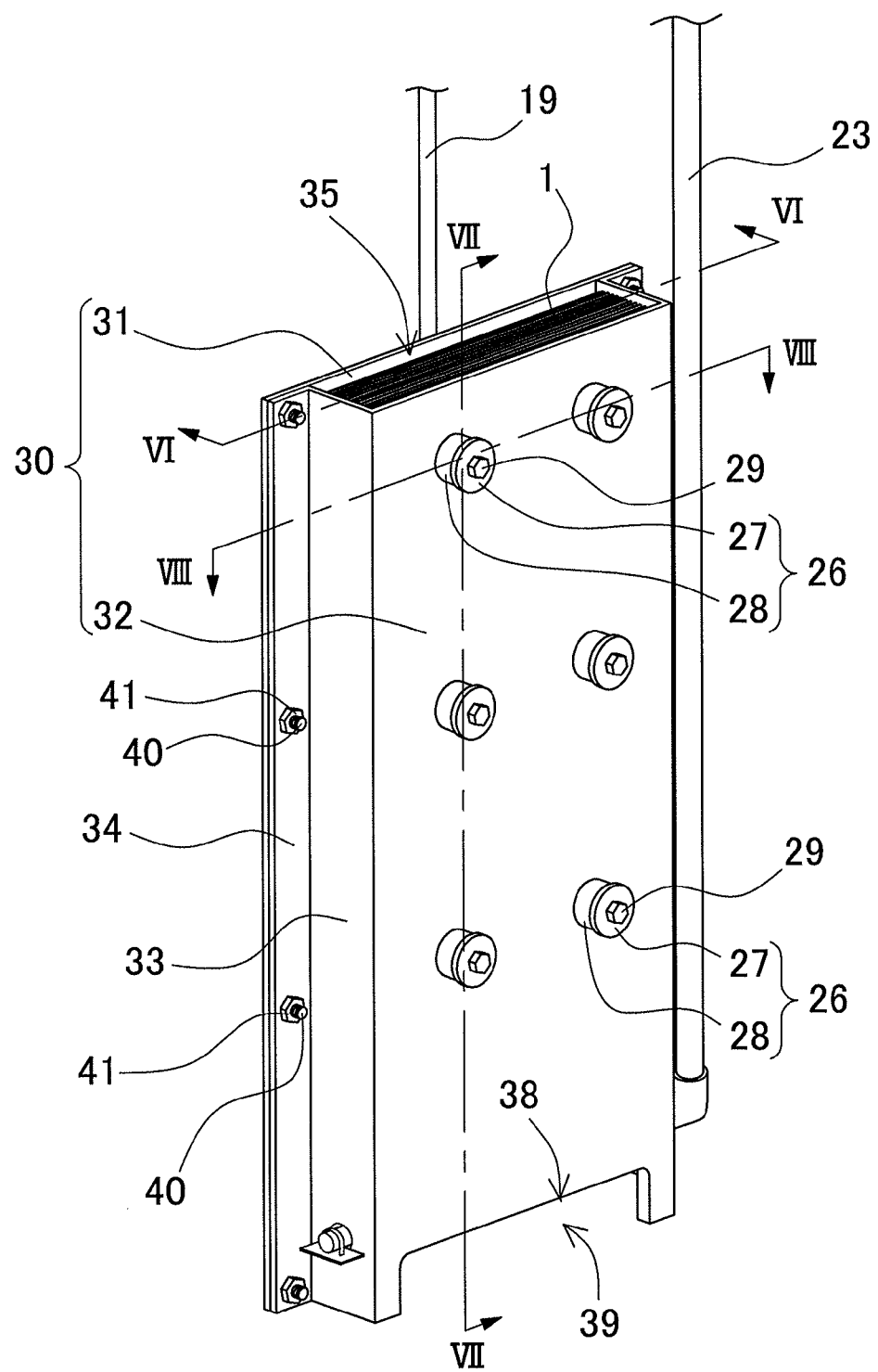
FIG. 5 is a perspective view of the filtration apparatus according to the embodiment of the present invention.
Figure 6:
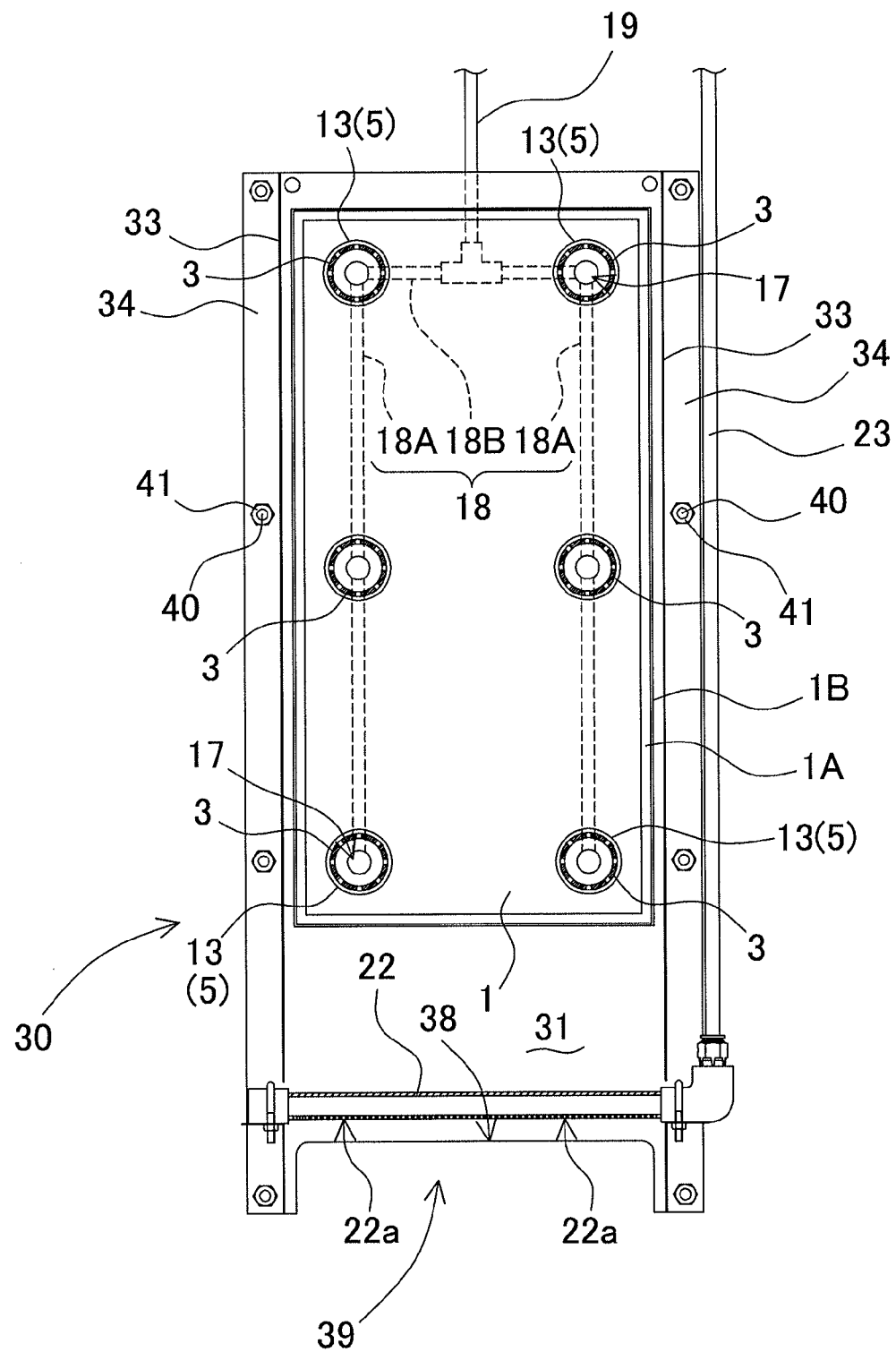
FIG. 6 is a sectional view of the filtration apparatus taken along line VI-VI in FIG. 5.

FIG. 4 shows an example of a filtration apparatus of the present invention in use. As shown in the figure, the filtration apparatus of the present invention is suitable for the following procedure, that is, immersing the filtration apparatus in a water-purification tank or a water tank 50 storing turbid water, filtering liquid such as water, followed by sucking and draining clear water. The filtration apparatus of the present invention is particularly suitable for draining clear water without turbidity by being immersed in turbid liquid in a water-purification tank or the like.

A filtration apparatus shown in FIGS. 4 to 10 includes a plurality of hollow filter sheets 1 each obtained by stacking two filters 11 and connecting outer peripheral edges thereof, and suction pipes 3 each extending thorough the plurality of hollow filter sheets 1 and connected to hollow portions 10 of the hollow filter sheets 1. The suction pipe 3 is connected to a suction side of a pump 9. The pump 9 sucks liquid in the suction pipe 3. The liquid sucked into the suction pipe 3 penetrates the hollow filter sheets 1 for filtration. That is, the pump 9 sucks the liquid in the hollow portions 10 of the hollow filter sheets 1 via the suction pipe 3 to cause the liquid to penetrate the hollow filter sheets 1 from the outside to the inside, thereby filtering the liquid.

Figure 10:
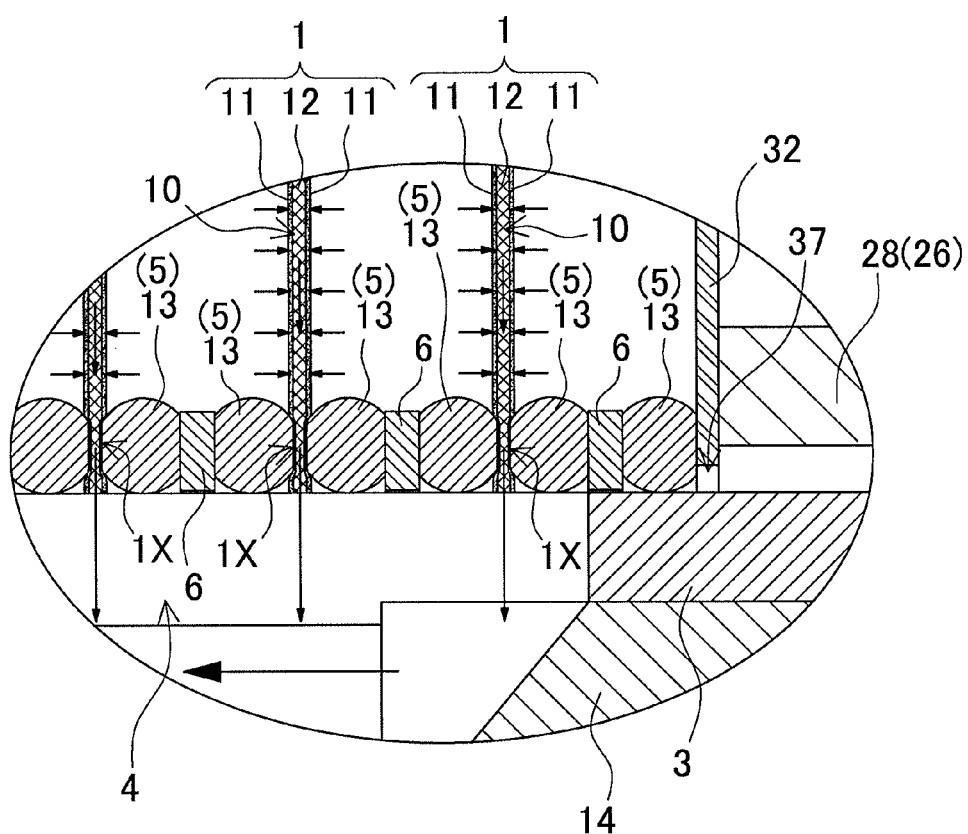
FIG. 10 is an enlarged sectional view of a main part of the filtration apparatus in FIG. 9.
Figure 11:
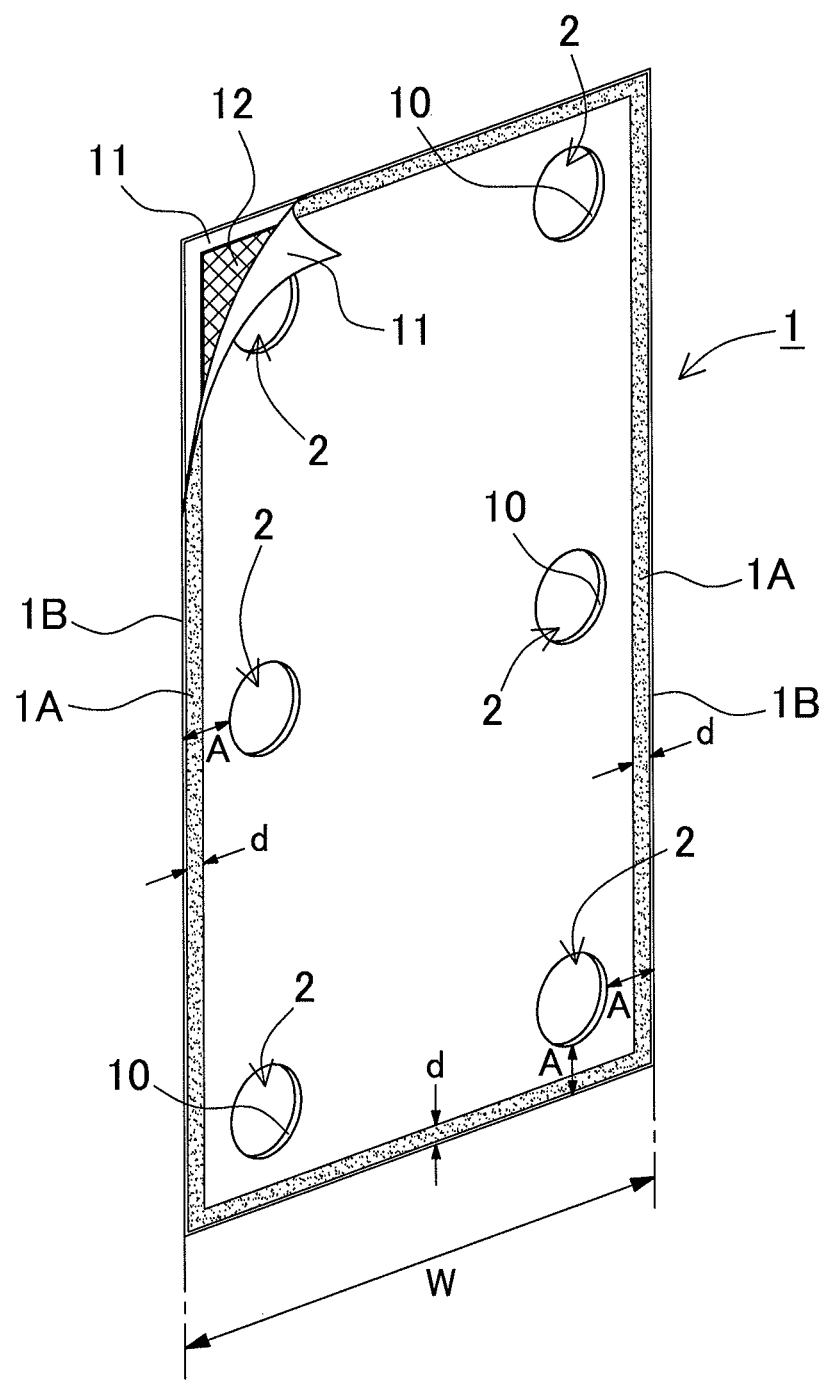
FIG. 11 is a perspective view showing a structure of a hollow filter sheet.
Figure 12:
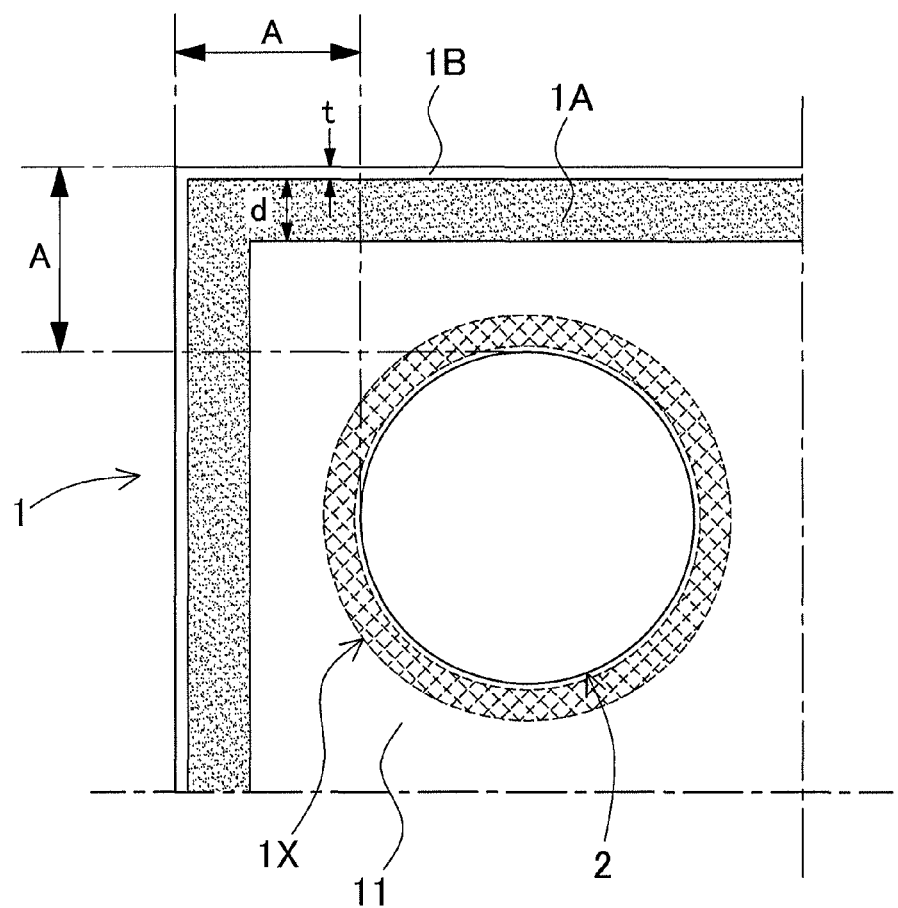
FIG. 12 is an enlarged front view showing a corner of the hollow filter sheet.

As shown in an enlarged sectional view of a main part in FIG. 10 and a perspective view in FIG. 11, the hollow portion 10 is provided between the two filters 11 in the hollow filter sheet 1. A spacer 12 with surfaces having pits and projections is provided in the hollow portion 10. In the hollow filter sheet 1, the outer peripheral edges of the two filters 11 are welded by heating or adhere to each other with an adhesive, providing the hollow portion 10 thereinside. The spacer 12 is clamped between the two filters 11. As for the hollow filter sheet 1 obtained by heat welding the two filters 11, the outer peripheral edges of the filters 11 can be welded by heat sealing or ultrasonic welding. The filter 11 is a flexible sheet obtained by providing a filtration membrane on a surface of a nonwoven fabric. The hollow filter sheet 1 in FIGS. 11 and 12 is provided with an adhesion portion 1A along an outer peripheral edge thereof. The adhesion portion 1A is obtained by welding or adhesion of the outer peripheral edges of the stacked two filters 11 by a predetermined width (d). Then, the hollow portion 10 is provided between the two filters 11. On the other hand, the outer peripheral edges of the two filters 11 are provided with a non-adhesion portion 1B without being welded or adhesion to each other. In the structure, by providing the non-adhesion portion 1B on the outer peripheral edge of the hollow filter sheet 1, the outer peripheral edge of the hollow filter sheet 1 is prevented from being hardened by welding, adhesion or the like. Damage of this portion can therefore be prevented effectively. The width (d) of the adhesion portion 1A on the outer peripheral edge is 10 mm and a width (t) of the non-adhesion portion 1B is 1.5 mm in the hollow filter sheet 1 shown in FIG. 12. However, the width (d) of the adhesion portion 1A may be 5 to 15 mm, while the width (t) of the non-adhesion portion 1B may be 1 to 5 mm.

Figure 13:
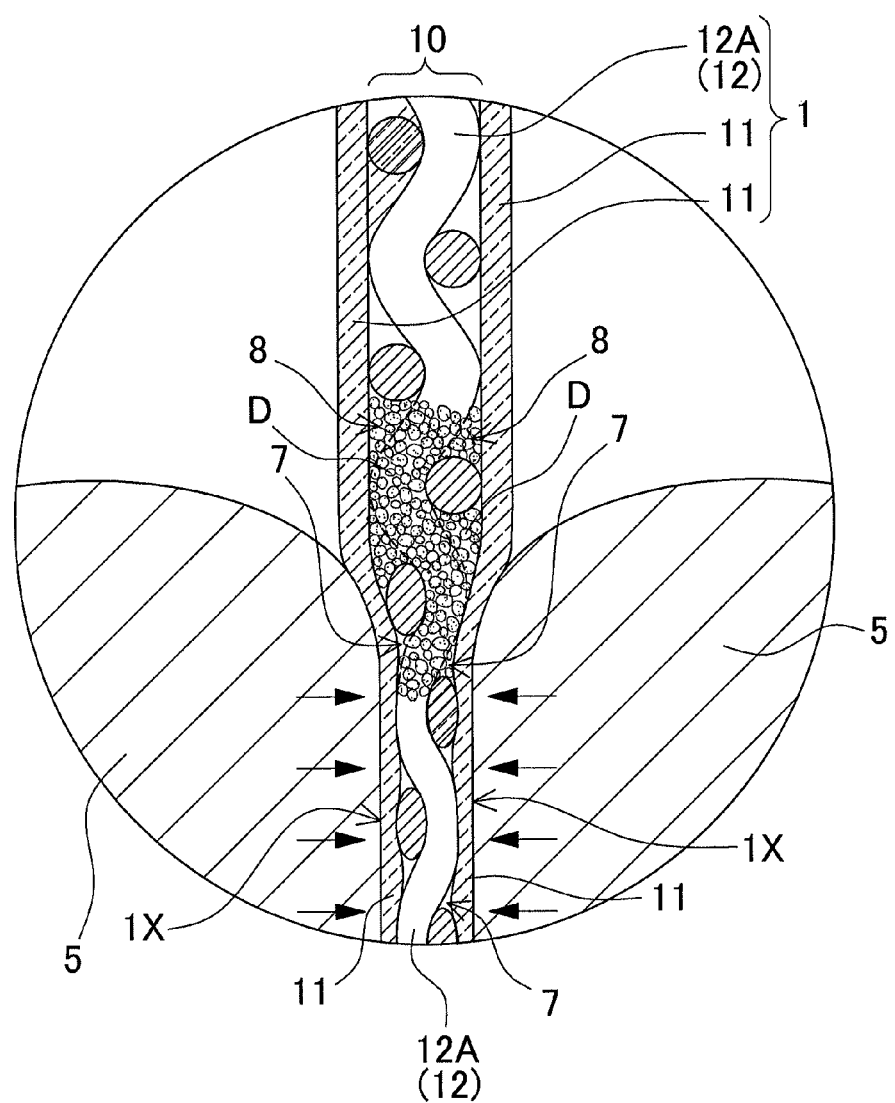
FIG. 13 is an enlarged sectional view of the main part of the filtration apparatus in FIG. 10 in which passage of filtered objects is restricted by narrow passage spaces.

As shown in an enlarged sectional view of a main part in FIG. 13, in the hollow filter sheet 1 with this structure, the spacer 12 with surfaces having pits and projections is clamped between the two filters 11, and the pits and projections on the both surfaces of the spacer 12 support the filters 11 from the inside, thereby providing the hollow portion 10 between the two filters 11. An internal interval of the hollow portion 10 is determined depending on a thickness of the spacer 12 in the hollow filter sheet 1 with this structure. One spacer 12 is provided between the two filters 11 in the shown hollow filter sheet 1. Accordingly, the internal interval of the hollow portion 10 in the hollow filter sheet 1 is determined by the thickness of the spacer 12 between the two filters 11. Alternatively, a plurality of spacers may be clamped between the two filters in the hollow filter sheet. As for this hollow filter sheet, an internal interval of the hollow portion is determined by a thickness and the number of the spacers clamped between the two filters. The internal interval of the hollow portion 10 is, for example, approximately 0.3 mm for allowing liquid penetrating the filters 11 and sucked into the hollow portion 10 to smoothly flow. The internal interval of the hollow portion may be, for example, 0.1 to 5 mm, preferably 0.1 to 3 mm, and more preferably 0.2 to 1 mm. The thickness of the spacer 12 between the two filters 11 may be 0.1 to 2 mm, and preferably 0.2 to 1 mm. Accordingly, the hollow filter sheet with a wide internal interval of the hollow portion is provided with the plurality of spacers stacked between the two filters. In the filtration apparatus of the present invention, both surfaces of the hollow filter sheet 1 are clamped and compressed by ring-shaped packings 5, as described later. At this time, the spacer 12 clamped between the two filters 11 is also compressed, however, the thickness of the spacer 12 here refers to a thickness of the spacer 12 not being compressed.

As shown in FIG. 13, in the hollow filter sheet 1, the pits and projections on the surfaces of the spacer 12 support the filters 11 from the inside, providing drainage spaces 8 between the filters 11 and the spacer 12. In the spacer 12 clamped between the two filters 11, the pits and projections on the both surfaces support the filters 11 from the inside. At this time, the drainage spaces 8 are provided among the pits and projections of the spacer 12 and the filters 11. The hollow filter sheet 1 causes liquid penetrating the filters 11 from the outside to the inside to pass through the drainage spaces 8 and flow into the suction pipe 3. In the hollow filter sheet 1 with this structure, a size of the drainage space 8 is determined by a size of the pits and projections on the surfaces of the spacer 12. Therefore, a shape or a size of the pits and projections on the surfaces is adjusted in the spacer 12 clamped between the two filters 11 in order that the drainage spaces 8 between the filters 11 and the spacer 12 may allow the liquid penetrating the filters 11 for suction to smoothly flow.

In the hollow filter sheet 1 in FIG. 13, a net 12A is used as the spacer 12 with surfaces having pits and projections. The spacer 12 of the net 12A is woven so as to cross linear members vertically and horizontally, providing a space between the linear members. According to a structure where the linear members are woven so as to cross each other, pits and projections are provided on surfaces. Plastic fibers such as polyester, polypropylene and polyethylene can be used as the linear member of the net 12A, for example. A size of the pits and projections on the surfaces of the spacer 12, that is, the net 12A is determined by a thickness and mesh of the linear members crossed vertically and horizontally. In the spacer 12 of the net 12A, when the linear members are thickened and the mesh is reduced, the pits and projections are increased in size and become sparse. On the other hand, when the linear members are thinned and the mesh is increased, the pits and projections are reduced in size and become dense. Considering these things, the thickness of the linear member and the mesh are determined in the net 12A. The thickness of the linear member of the net is 80 to 250 µm and preferably 110 to 190 µm, while the mesh of the net is 40 to 150 and preferably 60 to 100.

Although not shown, in the spacer, a plurality of linear members may be arranged in a grid pattern, and then, the linear members may be connected to each other at intersection points to form a whole shape into a netlike pattern, thereby providing pits and projections on surfaces. A size of the pits and projections of this spacer is also adjusted by a thickness and intervals of the plurality of linear members arranged in the grid pattern.

Figure 14:
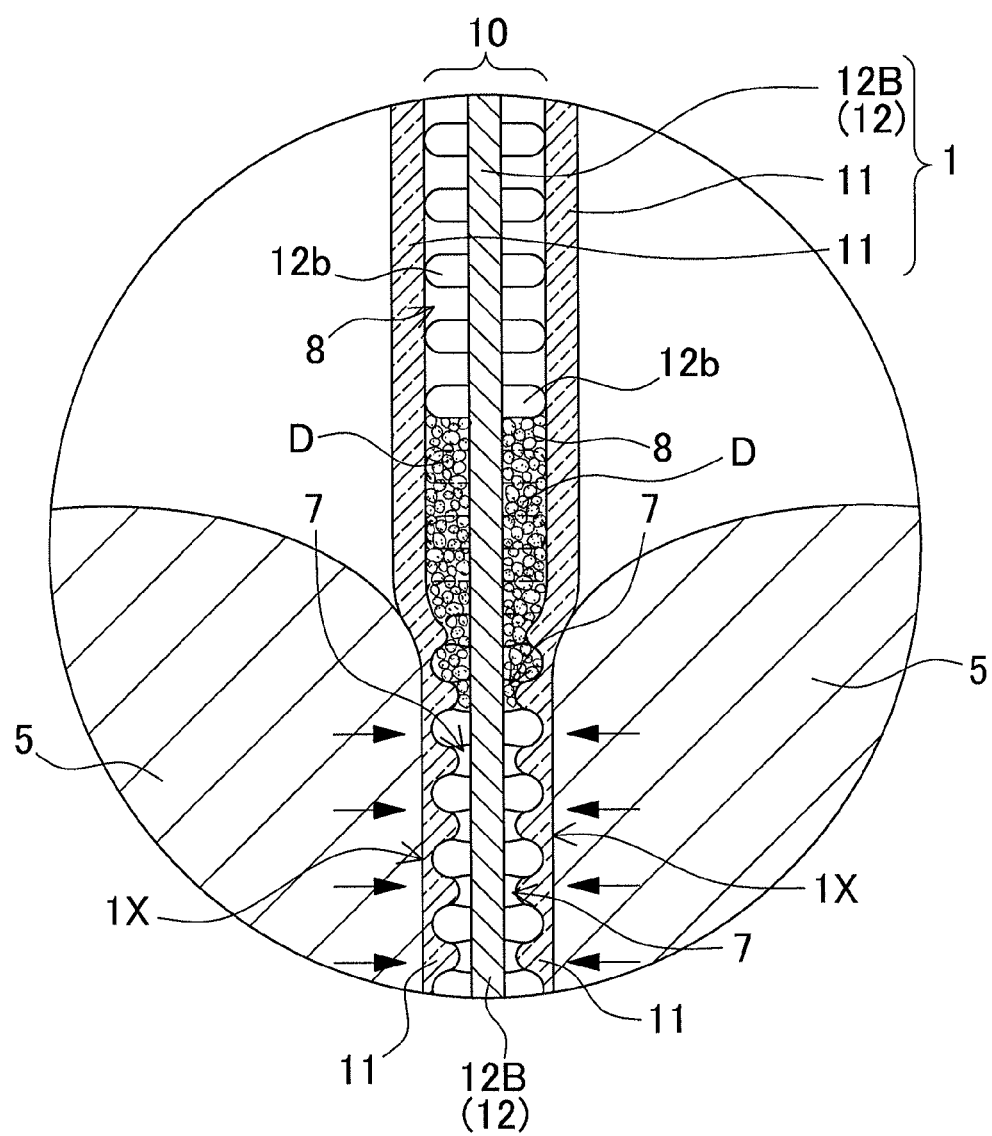
FIG. 14 is an enlarged sectional view of a main part of a filtration apparatus with a hollow filter sheet having another structure in which passage of filtered objects is restricted by the narrow passage spaces.

Further, as shown in an enlarged sectional view of the main part in FIG. 14, in the hollow filter sheet, a plate 12B with surfaces having pits and projections may also be used as the spacer 12 with surfaces having pits and projections instead of the net. The shown plate 12B is provided with pits and projections by providing a large number of projection portions 12b on surfaces thereof. Alternatively, pits and projections can also be provided on the surfaces of the plate by providing a plurality of grooves extending vertically and horizontally on the surfaces. In the plate 12B provided with a large number of projection portions 12b on the surfaces, a size and a density of the pits and projections are adjusted by adjusting a shape of the projection portion 12b, a height of projection, the number of projection portions 12b per unit area, or the like. As for the plate provided with the plurality of grooves extending vertically and horizontally on the surfaces, a size and a density of the pits and projections are adjusted by adjusting a shape, a width, a depth, an interval or the like of the grooves. As described above, the hollow filter sheet 1 obtained by clamping the spacer 12 of the plate 12B with surfaces having pits and projections between the two filters 11 is also provided with the hollow portion 10 between the two filters 11. The pits and projections on the surfaces of the spacer 12 support the filters 11 from the inside, providing the drainage spaces 8 between the filters 11 and the spacer 12.

The hollow filter sheet 1 has a plurality of through holes 2 opened for inserting the suction pipe 3 therethrough. The hollow filter sheet 1 is provided with the through holes 2 at a plurality of spots at an outer periphery thereof. The suction pipe 3 is inserted through the respective through holes 2, thereby fixing the plurality of hollow filter sheets 1 to the suction pipe 3 at the plurality of spots at the outer periphery. The shown hollow filter sheet 1 is rectangular in a whole external shape, and six through holes 2 are provided at the outer periphery. In the rectangular hollow filter sheet 1, the through holes 2 are opened at four corners thereof, and also three through holes 2 are provided along a long side of the rectangle. Six through holes 2 are opened at the outer periphery in total. However, the rectangular hollow filter sheet may be provided with three or more through holes along the long side. Further, the hollow filter sheet may be square in the whole external shape, and the through holes may be opened at four corners thereof. Although this structure is the simplest, the plurality of hollow filter sheets can be fixed to the suction pipe at the plurality of spots at the outer periphery.

Since the through hole 2 is provided for inserting the suction pipe therethrough, an inner shape thereof is slightly longer than an outer shape of the suction pipe 3, for example, 0.1 to 5 mm longer than the outer shape of the suction pipe 3. As for the hollow filter sheet 1 having the spacer 12 clamped thereinside, the through hole 2 is also provided in the spacer 12, allowing the suction pipe 3 to be inserted therethrough. The through hole 2 of the hollow filter sheet 1 can be formed by cutting with a cylindrical cutting instrument, for example. The through hole 2 can be formed by cutting the filters 11 and the spacer 12 with the cylindrical cutting instrument.

As shown in FIGS. 11 and 12, in the hollow filter sheet 1, a shortest distance (A) between an inner peripheral edge of the through hole 2 and the outer peripheral edge of the hollow filter sheet 1 is not more than 20% of a minimum width (W) of the hollow filter sheet 1 and also not more than 40 mm. In the shown hollow filter sheet 1, the minimum width (W) is 300 mm and the shortest distance (A) between the inner peripheral edge of the through hole 2 and the outer peripheral edge of the hollow filter sheet 1 is 30 mm. When the shortest distance (A) between the inner peripheral edge of the through hole and the outer peripheral edge of the hollow filter sheet is not more than 40 mm, and preferably not more than 30 mm, the outer periphery of the hollow filter sheet can be certainly fixed by the suction pipe.

Figure 9:
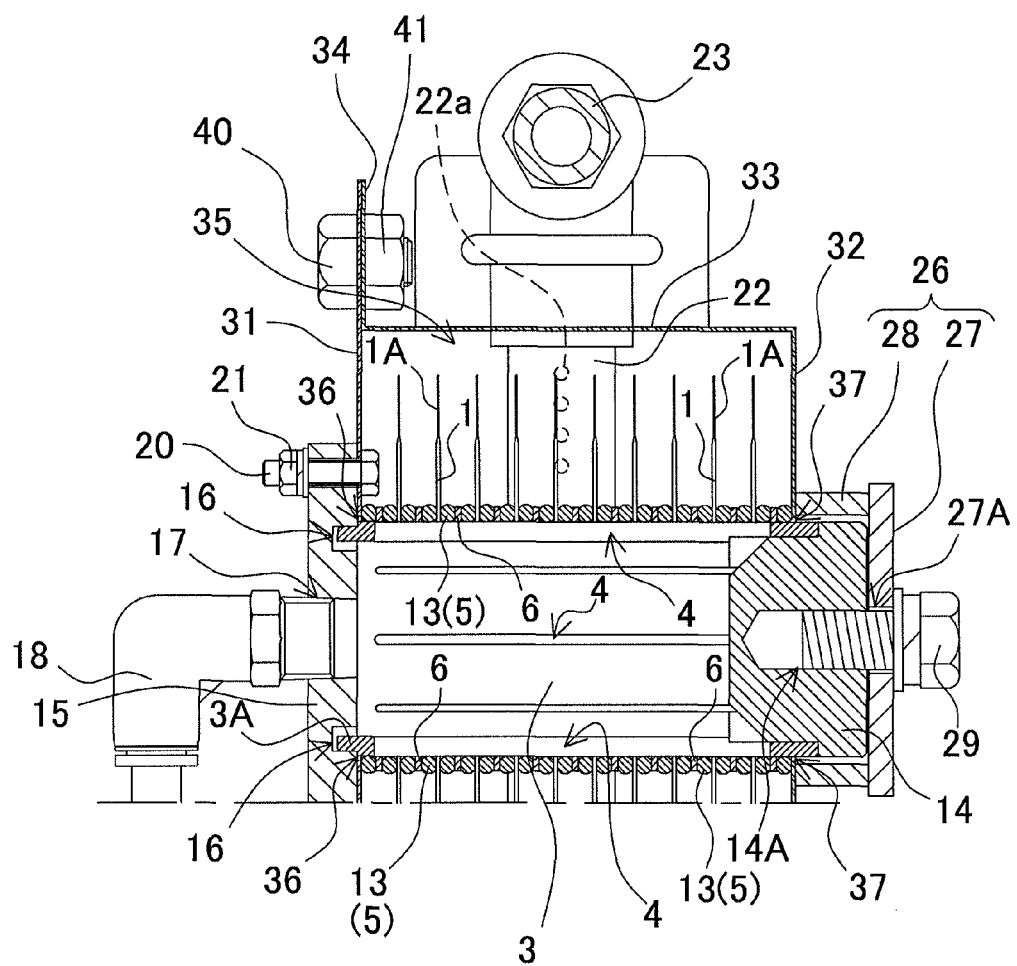
FIG. 9 is an enlarged sectional view of the filtration apparatus in FIG. 8.
Figure 15:
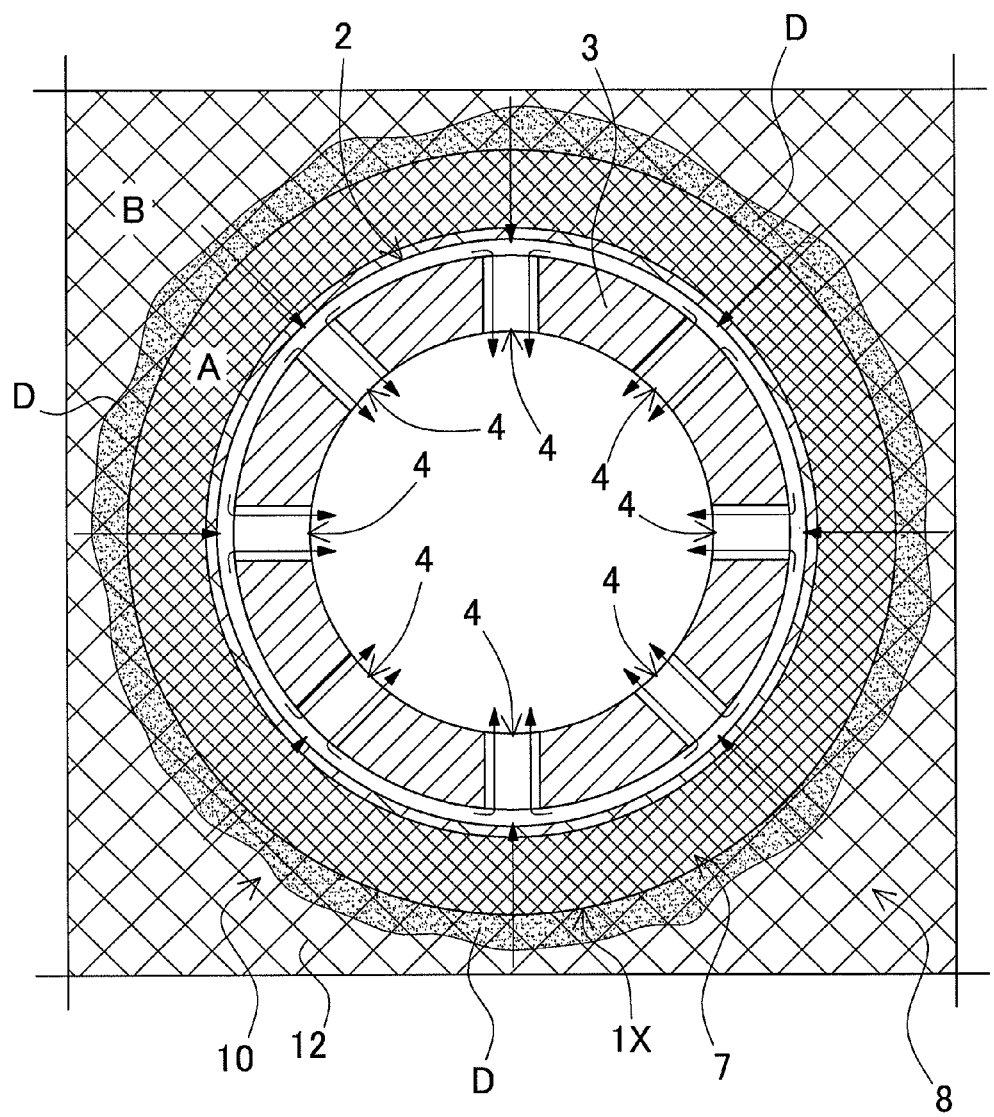
FIG. 15 is a cross-sectional view of a suction pipe in FIG. 9 in which passage of filtered objects is restricted by the narrow passage spaces.

The suction pipe 3 is a plastic pipe made of rigid plastic such as a vinyl chloride resin, and has a plurality of suction holes 4 opened in an outer peripheral surface. Alternatively, the suction pipe may be a plastic pipe made of a material other than the vinyl chloride resin or a metal pipe made of stainless steel or the like. The suction pipe 3 in FIG. 9 has a plurality of slit-like suction holes 4 extending in an axial direction opened in the outer peripheral surface. As shown in FIGS. 9 and 15, the suction pipe 3 is provided with the plurality of slit-like suction holes 4 at predetermined intervals in parallel with each other all over the periphery. The plurality of suction holes 4 all over the periphery extend in the axial direction to enable connection with the suction holes 4 even when a location to which the hollow filter sheet 1 is connected is shifted in the axial direction.

Figure 16:
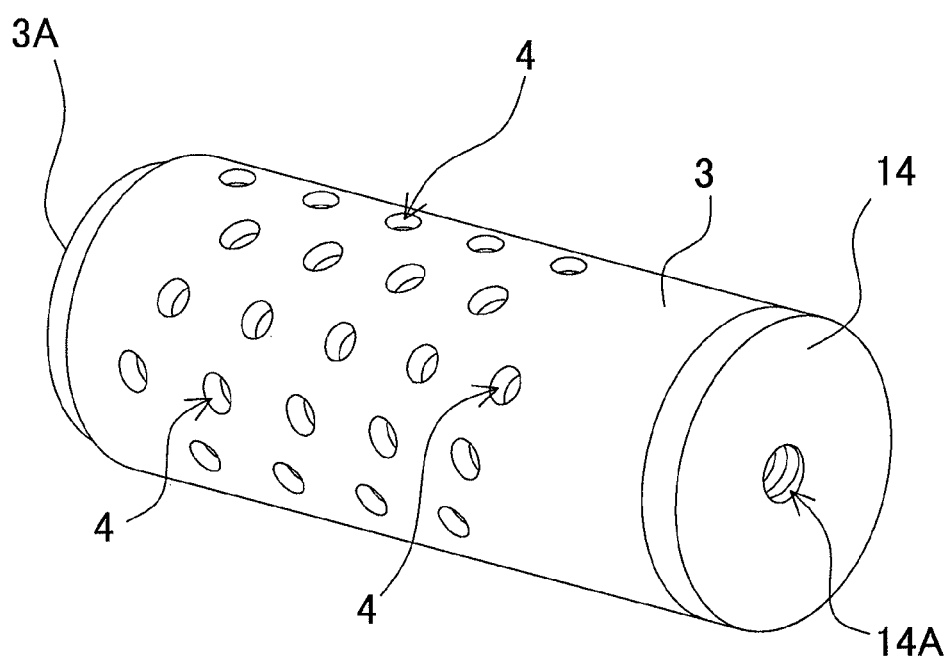
FIG. 16 is a perspective view of a suction pipe in another example.

The suction pipe is not necessarily provided with the slit-like suction holes. For example, a plurality of suction holes 4 may be opened apart from each other in the axial direction, as shown in FIG. 16. This suction pipe 3 is provided with the plurality of suction holes 4 all over the periphery to enable connection with any of the suction holes 4 even when the location to which the hollow filter sheet 1 is connected is shifted. That is, although the plurality of suction holes 4 are provided apart from each other in the axial direction, locations of the suction holes 4 all over the periphery can be shifted in the axial direction, and thereby the suction holes 4 can be connected to the hollow filter sheets 1 connected to all of the locations.

Figure 17:
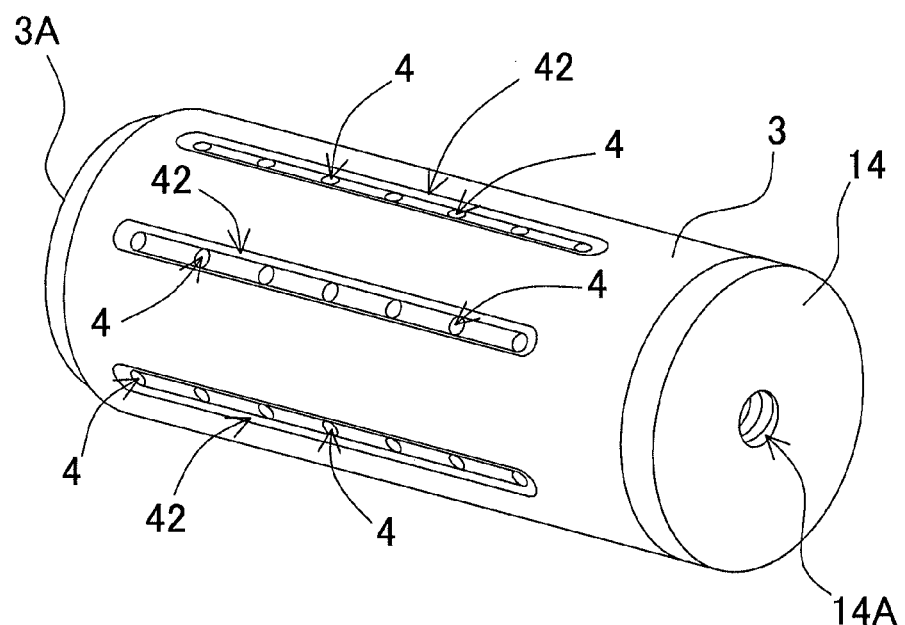
FIG. 17 is a perspective view of a suction pipe in another example.
Figure 18:
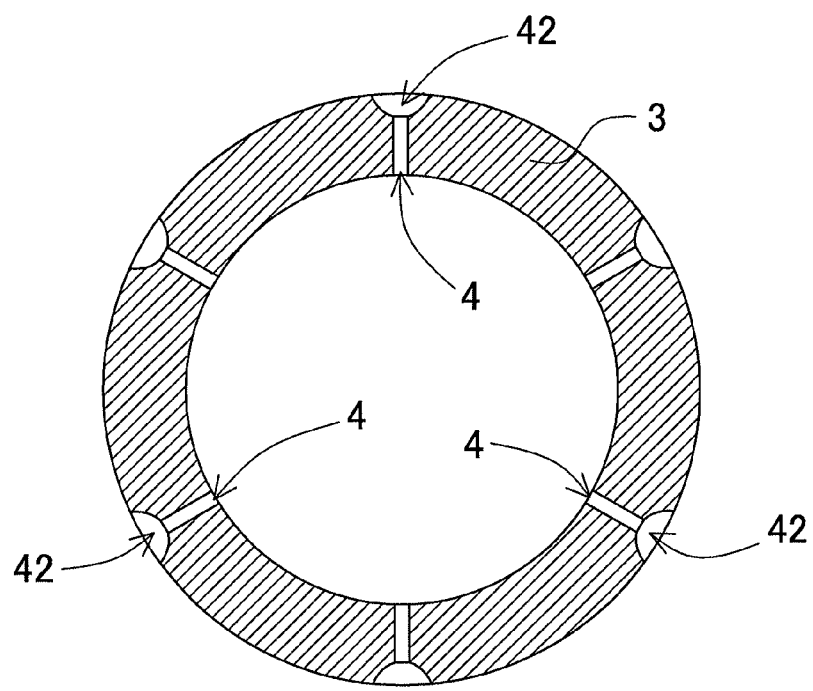
FIG. 18 is a cross-sectional view of the suction pipe in FIG. 16.

Further, as shown in FIGS. 17 and 18, the suction pipe 3 may be provided with a plurality of vertical grooves 42 extending in the axial direction and parallel with each other on the outer peripheral surface. The plurality of suction holes 4 apart from each other in the axial direction may also be opened in bottoms of these vertical grooves 42. This suction pipe 3 also allows all of the hollow filter sheets 1 to be connected to the suction holes 4 via a space inside the vertical groove 42 extending in the axial direction even when the location to which the hollow filter sheet 1 is connected is shifted.

Figure 19:
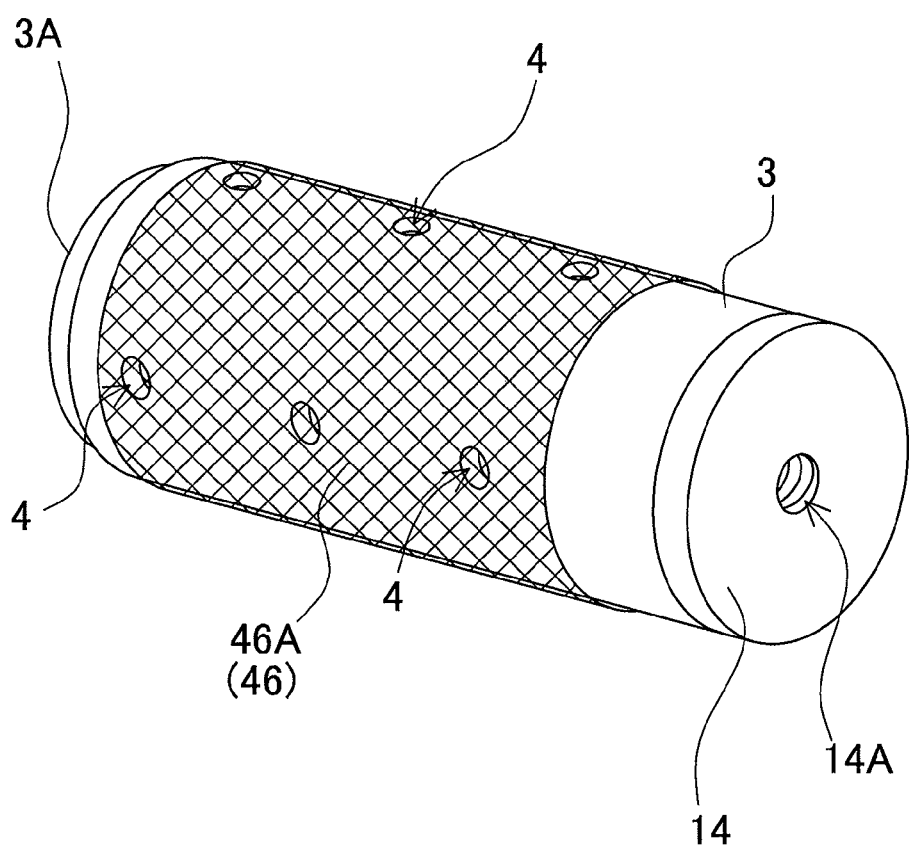
FIG. 19 is a perspective view of a suction pipe in another example.
Figure 20:
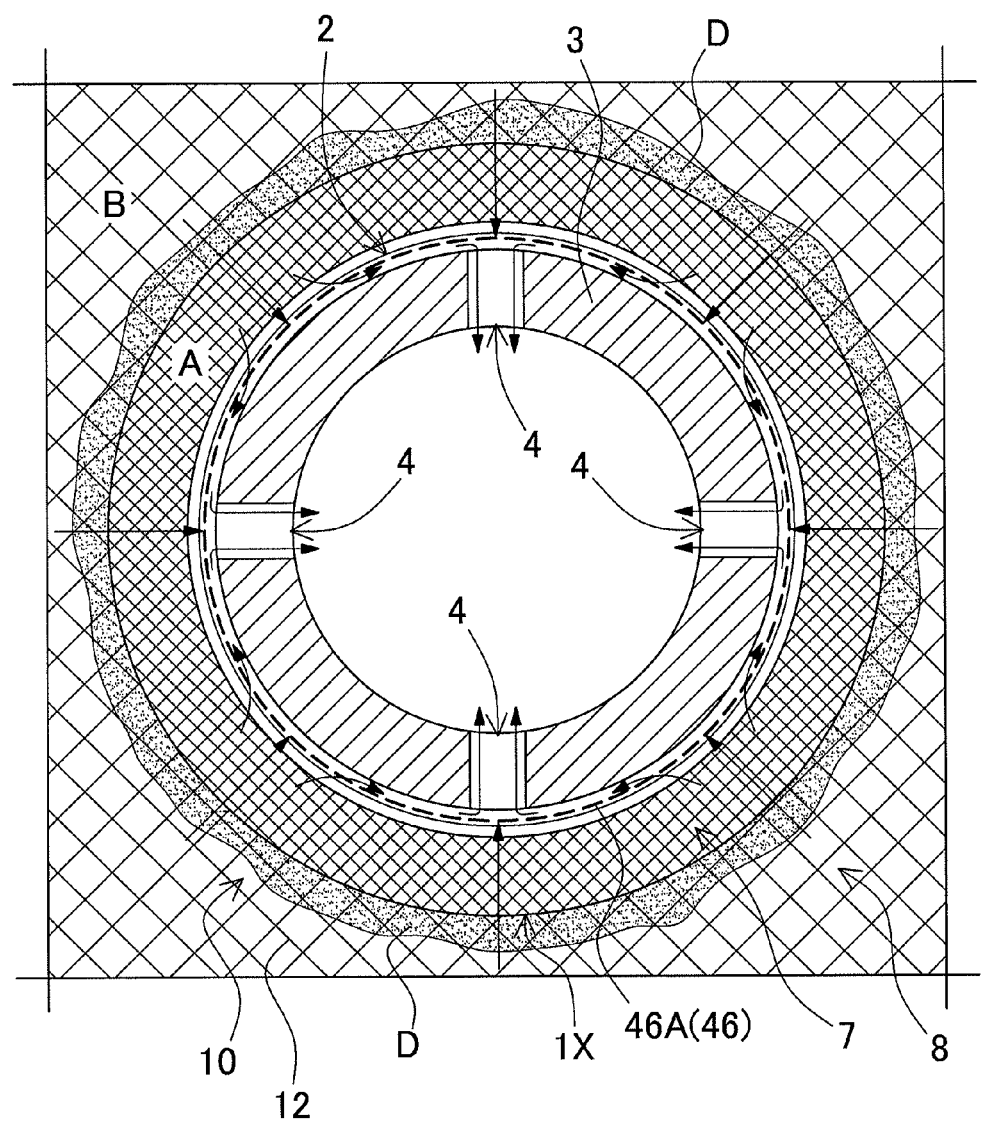
FIG. 20 is an enlarged cross-sectional view showing a positional relation between the suction pipe in FIG. 19 and a through hole of the hollow filter sheet in which passage of filtered objects is restricted by the narrow passage spaces.

The suction pipe 3 in FIGS. 19 and 20 further has a porous cylinder 46 stacked on the outer peripheral surface. The porous cylinder 46 is a cylinder provided with a large number of through holes on an outer peripheral surface thereof and is stacked on the outside of the plurality of suction holes 4 opened in the outer peripheral surface of the suction pipe 3. The shown suction pipe 3 is provided with the plurality of suction holes 4 at the predetermined and regular intervals along the outer peripheral surface. The suction pipe 3 is also provided with the plurality of suction holes 4 on the outer peripheral surface at regular intervals so as to be shifted in the axial direction. Alternatively, as for the suction pipe having the porous cylinder stacked on the outer peripheral surface, a plurality of suction holes may be opened randomly in the outer peripheral surface, a plurality of slit-like through holes extending in the axial direction may be opened, or the plurality of vertical grooves 42 extending in the axial direction may be provided in parallel with each other, and then the plurality of through holes may be opened apart from each other in the axial direction in the bottoms of these vertical grooves 42.

The shown porous cylinder 46 is obtained by wrapping a net 46A around the outer peripheral surface of the suction pipe 3 and forming the net 46A into a cylinder. A wire or plastic net can be used as the net 46A. The porous cylinder 46 can be easily provided by wrapping a sheet-like net around the outer peripheral surface of the suction pipe 3. Alternatively, the porous cylinder may be a cylinder inside which the suction pipe can be inserted and a large number of through holes may be opened in the outer peripheral surface.

Figure 21:
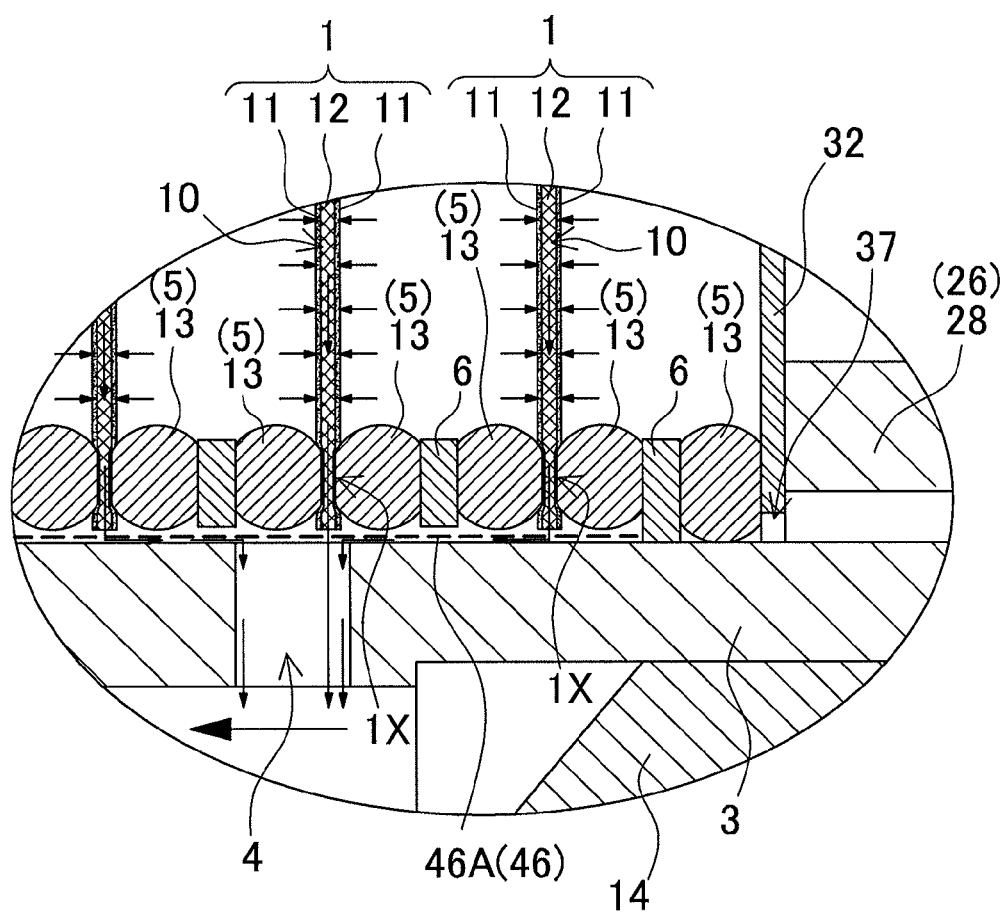
FIG. 21 is an enlarged sectional view of a main part in which the suction pipe in FIG. 19 sucks liquid.

As shown in FIGS. 20 and 21, when the suction pipe 3 having the porous cylinder 46 stacked on the outer peripheral surface is inserted into the through hole 2 of the hollow filter sheet 1, the suction holes 4 of the suction pipe 3 are connected to the hollow portion 10 of the hollow filter sheet 1 via the porous cylinder 46. As shown by the arrows in the figure, this filtration apparatus allows liquid penetrating the hollow portion 10 of the hollow filter sheet 1 to pass through the porous cylinder 46 stacked on the outer peripheral surface of the suction pipe 3 and to be sucked into the suction hole 4. Therefore, the liquid can be efficiently sucked from the nearly whole of an inner peripheral surface of the through hole 2 of the hollow filter sheet 1. Then, the liquid penetrating the hollow portion 10 of the hollow filter sheet 1 can be transferred to the suction pipe 3. Although processing of the suction pipe 3 is simplified by reducing the number of suction holes 4 opened in the suction pipe 3, this structure particularly enables the efficient suction of the liquid penetrating the hollow portion 10 of the hollow filter sheet 1 into the suction pipe.

The suction pipe 3 is connected to the plurality of hollow filter sheets 1 by being inserted through the through holes 2 of the hollow filter sheets 1. The filtration apparatus in FIGS. 4 to 8 has six suction pipes 3 provided in parallel with each other, each of which is inserted through the through holes 2 of the hollow filter sheets 1. Although the shown filtration apparatus has the six suction pipes 3 inserted through the hollow filter sheets 1, the number of the suction pipes may be five or less, or seven or more.

The plurality of hollow filter sheets 1 are connected to the suction pipes 3 in a stacked manner parallel with each other. In order to provide the hollow filter sheets 1 apart from each other, the ring-shaped packing 5 is provided between the hollow filter sheets 1. The ring-shaped packing 5 is clamped and fixed between the stacked hollow filter sheets 1 having the suction pipe 3 inserted therethrough. This ring-shaped packing 5 has an inner shape allowing the suction pipe 3 to be inserted therethrough and an outer shape longer than an inner shape of the through hole 2 of the hollow filter sheet 1. The ring-shaped packing 5 is clamped between the adjacent hollow filter sheets 1 to watertightly seal a gap between the hollow filter sheet 1 and the suction pipe 3. The ring-shaped packing 5 further watertightly blocks the suction holes 4 of the suction pipe 3 opened between the adjacent hollow filter sheets 1.

Each of the hollow filter sheets 1 is watertightly sealed by having the surfaces pressed with the ring-shaped packings 5 stacked on both sides of the hollow filter sheet 1 at an opening edge of the through hole 2. Under such a state, as shown in FIGS. 13 and 14, the two filters 11 of the hollow filter sheet 1 are pressed against the surfaces of the spacer by the ring-shaped packings 5 to be deformed into a shape according to the surfaces of the spacer 12, thereby providing narrow passage spaces 7 between the filters 11 and the spacer 12. That is, pressing the both surfaces of the filters 11 of the hollow filter sheet 1 with the ring-shaped packings 5 causes the filters 11 to be deformed into the shape according to the surfaces of the spacer 12, thereby forming the narrow passage spaces 7 between the filters 11 and the spacer 12. This narrow passage space 7 allows liquid to pass through but restricts passage of a filtered object D of a suspended solid in the liquid. The narrow passage spaces 7 are smaller than the drainage spaces 8 between the filters 11 and the spacer 12 not clamped by the ring-shaped packings 5. FIGS. 13 and 14 here show a state where the narrow passage spaces 7 restrict the passage of the filtered objects D of the suspended solid in the liquid to cause the filtered objects D to accumulate outside the narrow passage spaces 7.

A rubber elastic body may be used as the ring-shaped packing 5. One obtained by forming rubber, silicon or the like into a ring shape is used as the rubber elastic body, for example. The ring-shaped packings 5 of the rubber elastic bodies are elastically deformed to elastically press the surfaces of the filters 11 when the suction pipe 3 is inserted through the plurality of hollow filter sheets 1 and the ring-shaped packings 5 in a clamped manner to each other. As shown by the broken line in FIG. 12, the ring-shaped packing 5 presses the surface of the filter 11 along the ring shape at an edge of the through hole 2 of the hollow filter sheet 1, and therefore, the narrow passage spaces 7 are formed between the filter 11 and the spacer 12 in a clamped portion 1X that is pressed into the ring shape. A pressing force of the ring-shaped packing 5 pressing the surface of the filter 11 determines a size of the narrow passage space 7 between the filter 11 and the spacer 12. When the pressing force of the ring-shaped packing 5 pressing the surface of the filter 11 becomes strong, the narrow passage space 7 between the filter 11 and the spacer 12 becomes narrow, thereby effectively restricting the passage of the solid filtered objects D. On the contrary, when the pressing force of the ring-shaped packing 5 pressing the surface of the filter 11 becomes weak, the narrow passage space 7 between the filter 11 and the spacer 12 becomes wide, thereby enabling the efficient penetration of the liquid. Accordingly, the pressing force of the ring-shaped packing 5 pressing the surface of the filter 11 is adjusted so that the narrow passage space 7 between the filter 11 and the spacer 12 is formed in such a size as to allow the liquid to efficiently pass through but effectively restrict the passage of the filtered objects D of the suspended solid in the liquid. The pressing force of the ring-shaped packing 5 pressing the surface of the filter 11 is adjusted so that a pressing force with respect to a unit length in a circumferential direction is 1 to 6 kgf/cm, for example. A length of the ring-shaped packing in the circumferential direction here refers to a length in the circumferential direction calculated with an average value between the inner shape and the outer shape of the ring-shaped packing.

As shown in FIGS. 13 and 14, the above hollow filter sheet 1 has the both surfaces clamped with the ring-shaped packings 5 to cause the filters 11 to be deformed according to the surfaces of the spacer 12, thereby providing the narrow passage spaces 7 smaller than the drainage spaces 8. In the hollow filter sheet 1, the spacer 12 itself is also deformed so as to be squashed by the pressing force of the ring-shaped packings 5, causing the pits and projections on the surfaces to be reduced in size. Therefore, the narrow passage spaces 7 smaller than the drainage spaces 8 are formed. As described above, the narrow passage spaces 7 formed in the clamped portion 1X pressed by the ring-shaped packings 5 allow the liquid sucked from the hollow portion 10 of the hollow filter sheet 1 into the suction pipe 3 to pass through but restrict the passage of the filtered objects D of the suspended solid in the liquid, as shown in FIGS. 13 to 15. The filtered objects D are therefore effectively prevented from flowing into the suction pipe 3.

In the above filtration apparatus in which the narrow passage spaces 7 are provided in the clamped portion 1X of the hollow filter sheet 1 clamped by the ring-shaped packings 5, assume that the adhesion portion at the outer periphery of the hollow filter sheet 1 comes off or the surface of the filter 11 is partially opened due to damage or the like, and therefore, turbid water and sludge enters inside the hollow filter sheet 1 from thus obtained opening. Even in that case, the filtered objects D of solid elements of the turbid water and sludge are blocked by the narrow passage spaces 7 to accumulate, thereby effectively preventing the filtered objects D from being sucked into the suction pipe 3, as shown in FIGS. 13 and 14. The narrow passage spaces 7 shown by cross-hatching A in FIGS. 15 and 20 restrict the passage of the filtered objects D of the solid elements of the turbid water and sludge to a side of the suction pipe 3. The filtered objects D gather and accumulate in an outside region of the ring-shaped clamped portion 1X, that is, a boundary part between the hollow portion 10 of the hollow filter sheet 1 shown by cross-hatching B in FIGS. 15 and 20 and the ring-shaped clamped portion 1X. As a result, the filtered objects D are not sucked into the suction pipe 3.

A filtration apparatus in FIGS. 9 and 10 employs an O-ring 13 as the ring-shaped packing 5. The O-ring 13 comes in close contact with the surface of the hollow filter sheet 1 to watertightly seal a side surface of the hollow filter sheet 1. The filtration apparatus in FIGS. 9 and 10 is further provided with the plurality of ring-shaped packings 5 between the adjacent hollow filter sheets 1 to clamp a ring-shaped spacer 6 between the ring-shaped packings 5. The shown ring-shaped spacer 6 is made of resin with side surfaces thereof in close contact with the ring-shaped packings 5 of the O-rings 13. Alternatively, the ring-shaped spacer may also be a metal ring. The ring-shaped spacer 6 has a disk-like shape with a predetermined thickness. An inner shape thereof is nearly equal to the outer shape of the suction pipe 3 and an outer shape thereof is nearly equal to an outer shape of the O-ring 13. Planes on the both sides are in close contact with the ring-shaped packings 5 of the O-rings 13. According to the structure in which the ring-shaped spacer 6 is clamped between the pair of ring-shaped packings 5, the ring-shaped packings 5 come in close contact with the both surfaces of the ring-shaped spacer 6, thereby enabling watertight sealing more certainly. An interval between the adjacent hollow filter sheets 1 can be adjusted by the thickness of the ring-shaped spacer 6. That is, the interval between the hollow filter sheets 1 can be adjusted to an optimal value by the ring-shaped spacer 6, while the O-ring 13 with a circular section is thin. However, the filtration apparatus is not necessarily provided with the ring-shaped spacer. As for such filtration apparatus, a plurality of ring-shaped packings and hollow filter sheets are stacked alternately, and then a gap between the hollow filter sheet and the suction pipe can be watertightly sealed with this ring-shaped packing.

Figure 22:
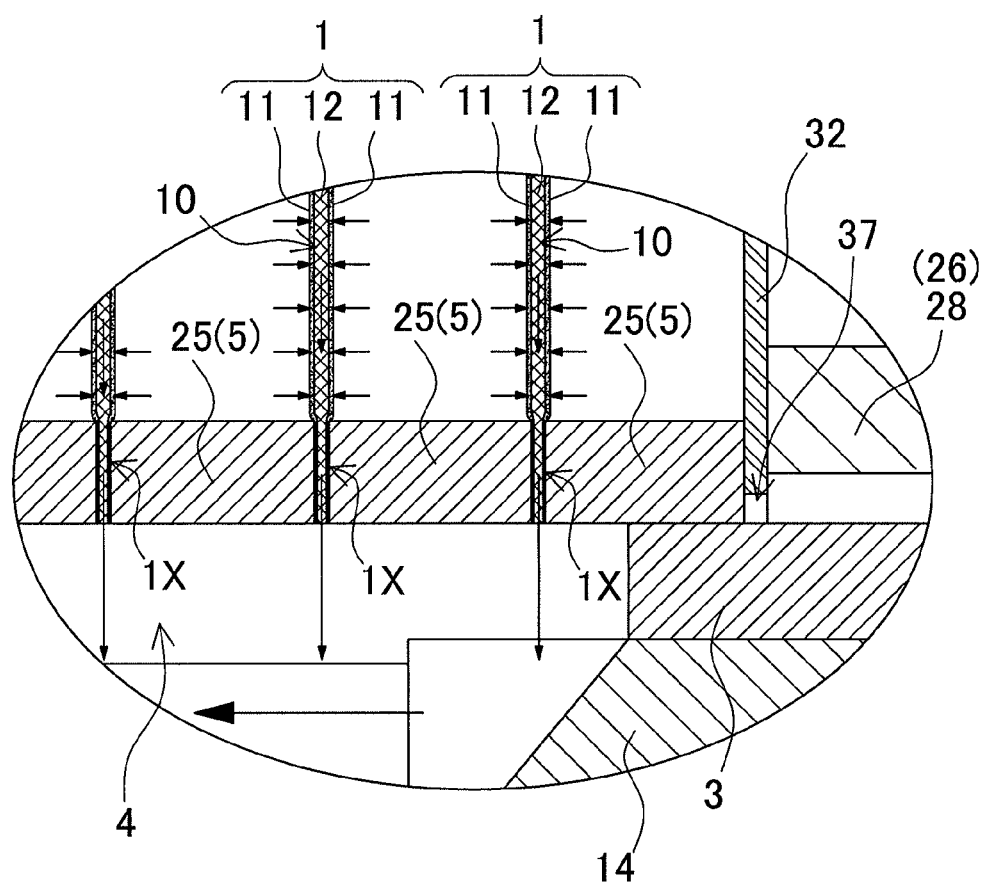
FIG. 22 is an enlarged sectional view of a main part of a filtration apparatus according to another embodiment of the present invention.
Figure 23:
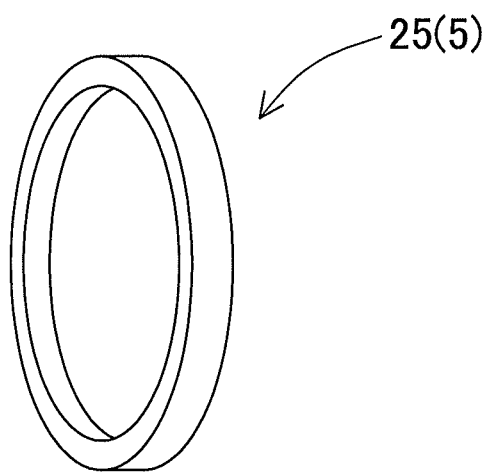
FIG. 23 is a perspective view of a ring-shaped packing of the filtration apparatus in FIG. 22.

Although the O-ring 13 is used as the ring-shaped packing 5 in the filtration apparatus in FIGS. 9 and 10, the O-ring is not necessarily used as the ring-shaped packing. All the other members can be used as long as the ring-shaped packing is provided between the adjacent hollow filter sheets with the suction pipe inserted therethrough to watertightly seal the side surface of the hollow filter sheet as well as to press the filter for forming the narrow passage space between the filter and the spacer. A filtration apparatus in FIG. 22 employs a cylindrical ring 25 shown in FIG. 23 as the ring-shaped packing 5. The ring-shaped packing 5 of the cylindrical ring 25 is produced by forming, for example, a rubber elastic body such as rubber or silicon into a cylindrical shape with a predetermined thickness, followed by cutting the cylindrical rubber elastic body into a predetermined length. Both ends of the cylindrical ring 25 come in close contact with the side surfaces of the hollow filter sheets 1, achieving watertight sealing. A length of the ring-shaped packing 5 of the cylindrical ring 25 is determined so that an interval between the adjacent hollow filter sheets 1 becomes optimal. Thus, according to the structure employing the cylindrical ring 25 as the ring-shaped packing 5, the plurality of hollow filter sheets 1 can be simply and easily stacked in parallel with each other, and can be provided at optimal intervals.

When the intervals between the stacked hollow filter sheets 1 become narrow, the suction pipe 3 can be inserted through a large number of hollow filter sheets 1. However, when the intervals of the hollow filter sheets 1 are extremely narrow, surfaces of the adjacent hollow filter sheets 1 come in contact with each other, leading to a failure in filtration of the liquid with the whole surfaces. Therefore, the interval between the hollow filter sheets 1 is set so that the adjacent hollow filter sheets 1 do not come in close contact with each other at the time of sucking the liquid by the suction pipe 3, for example, 5 to 10 mm. An optimal value of the interval between the hollow filter sheets, however, changes depending on the thickness or flexibility of the hollow filter sheet.

As for the filtration apparatus in FIGS. 5 to 9, the plurality of hollow filter sheets 1 stacked in parallel with each other are housed in an outer case 30. In the shown outer case 30, a first plate 31 of a metal plate is connected to a second plate 32 of a metal plate bent into a groove shape, thereby providing a housing portion 35 that houses the plurality of hollow filter sheets 1 inside thereof. Accordingly, the outer case 30 including the first plate 31 and second plate 32 has an outer shape larger than the hollow filter sheet 1. The second plate 32 is provided with side walls 33 on both sides thereof to be formed into a groove shape. In the outer case 30, ends of the side walls 33 on the both sides of the second plate 32 are connected to side edges of the first plate 31, providing the pipe-like outer case 30 with a top and a bottom parts open. In the second plate 32, the end of the side wall 33 is provided with a bent piece 34 that is bent outward. The first plate 31 is connected to the second plate 32 via set screws 40 and nuts 41 extending through the bent pieces 34 and the both edges of the first plate 31. Further, in the shown outer case 30, notches 38 are provided on lower ends of the first plate 31 and the second plate 32, thereby providing a space 39 when the outer case 30 is placed on a bottom of the water tank 50. Although not shown, the outer case can also hold the filtration apparatus in a standing position so as not to fall down by having a supporting leg connected to the lower end. The above outer case 30 employs metal plates as the first plate 31 and the second plate 32. However, either of or both of the first plate and the second plate in the outer case may also be produced with rigid plastic such as a vinyl chloride resin.

Further, in the shown filtration apparatus, each of the first plate 31 and the second plate 32 is provided on an end of the suction pipe 3 to be connected each other by the suction pipe 3, and then, the stacked hollow filter sheets 1 are fixed in a clamped manner. That is, in the shown filtration apparatus, the stacked hollow filter sheets 1 are fixed in the clamped manner via the first plate 31 and the second plate 31 of the outer case 30 with the suction pipe 3 being simultaneously used as a connector for connecting the first plate 31 and the second plate 32. The first plate 31 and the second plate 32 of both surfaces of the outer case 30 are respectively provided with a plurality of insertion holes 36 and 37 through which the suction pipes 3 are inserted. The insertion holes 36 and 37 are opened to be provided vertically apart from each other on both sides of the first plate 31 and the second plate 32, respectively. As for the shown filtration apparatus, since six suction pipes 3 are connected to the stacked hollow filter sheets 1, six each of the insertion holes 36 and 37 are provided in the first plate 31 and the second plate 32, respectively.

In the shown filtration apparatus, a blocking plate 15 is fixed on an outer surface of the insertion hole 36 of the first plate 31. The blocking plate 15 has an outer shape larger than the insertion hole 36, thereby blocking the insertion hole 36 of the first plate 31. The blocking plate 15 is fixed to the first plate 31 at an opening edge of the insertion hole 36 via a set screw 20 extending through the first plate 31 and the blocking plate 15 and a nut 21 in which the set screw 20 is screwed. The blocking plate 15 is provided with a ring-shaped positioning concave portion 16 that is located inside the insertion hole 36 and into which one end of the suction pipe 3 is inserted for connection. As shown in FIG. 9, one opening end of the suction pipe 3 is fitted into and fixed to the positioning concave portion 16 of the blocking plate 15. An end of the suction pipe 3 inserted into the positioning concave portion 16 is provided with a step so as to reduce the outer shape. Thus, a thin projection portion 3A is made nearly equal to an inner shape of the positioning concave portion 16 to fix the suction pipe 3 at a fixed position. In the blocking plate 15 to which the suction pipe 3 is fixed, a suction hole 17 communicating with the suction pipe 3 is opened in a center of the positioning concave portion 16. A connection pipe 18 is connected to the suction hole 17 of the blocking plate 15 in order to suck the liquid inside the suction pipe 3 with the pump 9.

Figure 7:
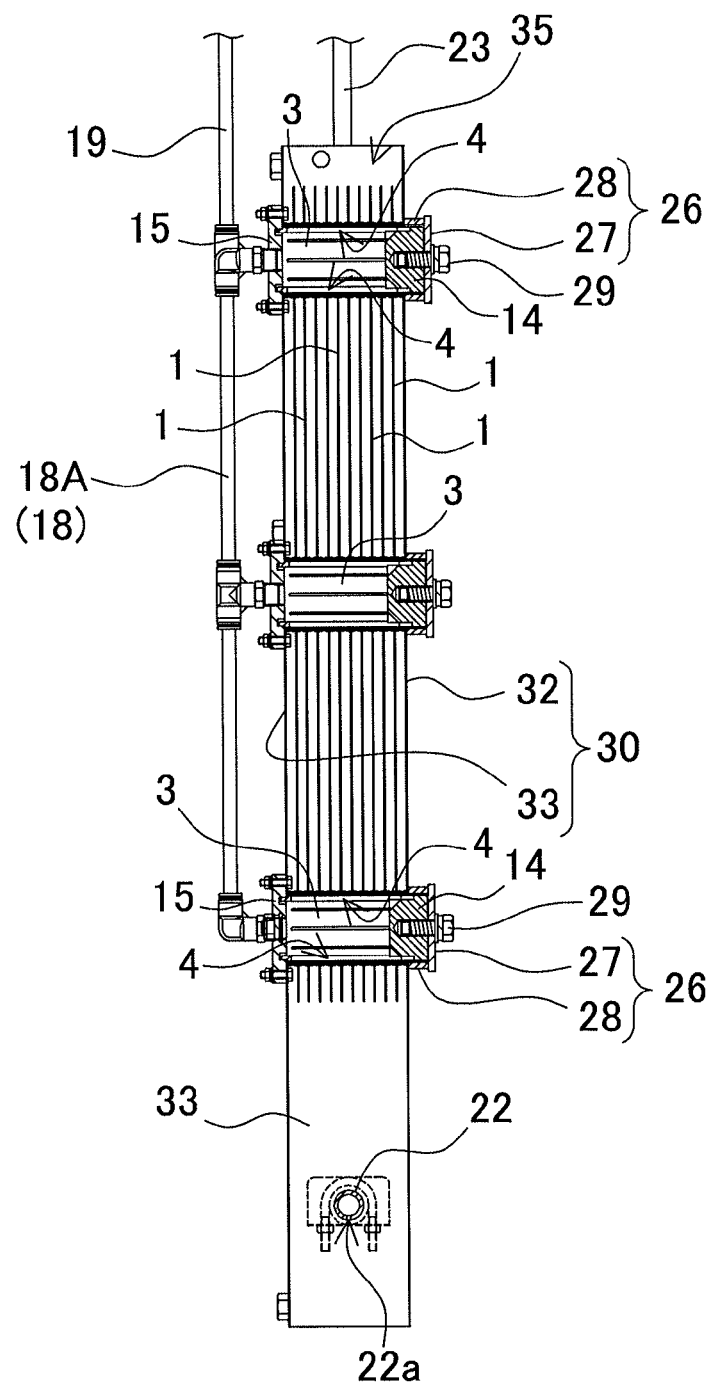
FIG. 7 is a sectional view of the filtration apparatus taken along line VII-VII in FIG. 5.
Figure 8:
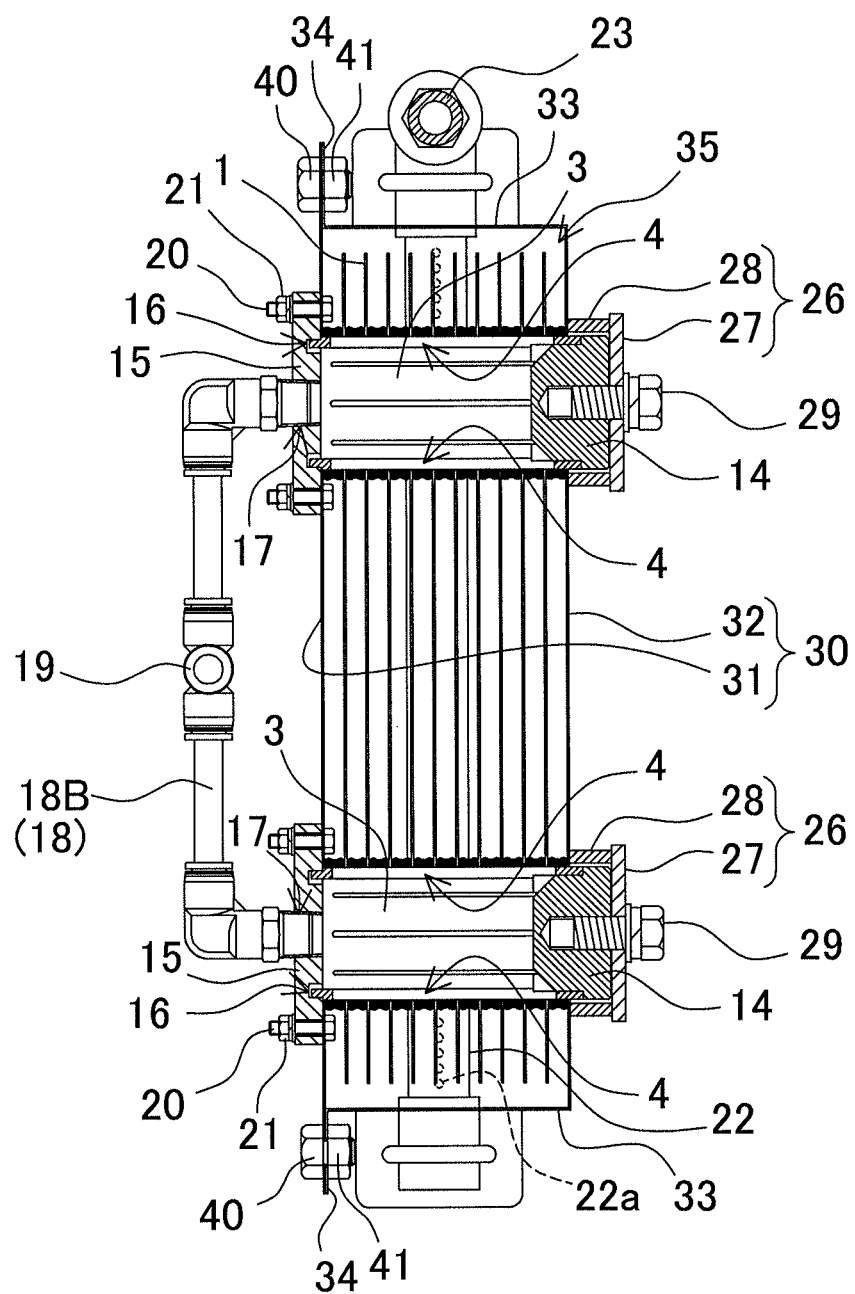
FIG. 8 is a sectional view of the filtration apparatus taken along line VIII-VIII in FIG. 5.

Further, as shown in FIGS. 7 to 9, the other opening end of the suction pipe 3 is blocked by a blocking portion 14. The end of the suction pipe 3 projects from the insertion hole 37 of the second plate 32 to the outside. The suction pipe 3 is connected to the second plate 32 via a clamp member 26 connected to the end projecting from the second plate 32. A tip surface of the blocking portion 14 fixed to the end of the suction pipe 3 is provided with a female screw hole 14A in which a set screw 29 for connection with the clamp member 26 is screwed. The clamp member 26 includes a circular support plate 27 having an outer shape longer than that of the blocking portion 14, and a pressure ring 28 provided between an outer periphery of the support plate 27 and the second plate 32. An insertion hole 27A into which the set screw 29 is inserted is opened in a center of the support plate 27. In the shown clamp member 26, the pressure ring 28 is fixed to an outer peripheral edge of the support plate 27 as a different member from the support plate 27, however, the pressure ring and the support plate can be integrally formed as the clamp member.

In the shown filtration apparatus, the support plate 27 is fixed to the blocking portion 14 of the suction pipe 3 by screwing the set screw 29 that passes through the support plate 27, and then, the second plate 32 is pressed by the pressure ring 28 via the support plate 27 fixed to the suction pipe 3, thereby fixing the opposing first plate 31 and second plate 32 at a predetermined interval. Accordingly, a thickness of the pressure ring 28 is designed to a predetermined thickness so that the hollow filter sheets 1 stacked via the ring-shaped packings 5 can be clamped in a close contact manner at the interval between the first plate 31 and the second plate 32. In this structure, the opposing first plate 31 and second plate 32 can be always connected to each other at the predetermined interval by forming the pressure ring 28 with a rigid member. However, the pressure ring may be formed with a member capable of elastic deformation such as a rubber elastic body or a coil spring, thereby elastically pressing the first and second plates. According to this structure, the ring-shaped packings and the hollow filter sheets between the first and second plates can be clamped with a predetermined pressing force.

The suction pipe 3 is inserted through the plurality of hollow filter sheets 1. The ring-shaped packing 5, the ring-shaped spacer 6 and the ring-shaped packing 5 are stacked and each provided between the respective hollow filter sheets 1. As for the filtration apparatus shown in the sectional view in FIG. 9, the ring-shaped packings 5 and the ring-shaped spacer 6 are further stacked and provided outside the outermost hollow filter sheet 1. In FIG. 9, the ring-shaped packing 5, the ring-shaped spacer 6 and the ring-shaped packing 5 are stacked outside the rightmost hollow filter sheet 1 in the suction pipe 3. In FIG. 9, the ring-shaped packing 5, the ring-shaped spacer 6 and the ring-shaped packing 5 are also stacked outside the leftmost hollow filter sheet 1 in the suction pipe 3. Inner surfaces of the first plate 31 and the second plate 32 are therefore sealed watertightly. As for the filtration apparatus in FIG. 22, the ring-shaped packing 5 of the cylindrical ring 25 is each provided between the respective hollow filter sheets 1 without providing the ring-shaped spacer. In this filtration apparatus, the ring-shaped packing 5 of the cylindrical ring 25 is also provided outside the outermost hollow filter sheet 1 to watertightly seal the inner surfaces of the first plate 31 and the second plate 32.

Further, in the shown filtration apparatus, the connection pipe 18 is connected to the suction hole 17 of the blocking plate 15, while an extension pipe 19 is connected to this connection pipe 18. Then, the suction pipe 3 is connected to the pump 9 via the connection pipe 18 and the extension pipe 19. The shown connection pipe 18 includes two branch pipe portions 18A each connecting the three suction pipes 3 that are fixed to each side of the outer case 30, and a connection portion 18B connecting the two branch pipe portions 18A. The connection portion 18B of the connection pipe 18 is connected to the extension pipe 19. According to this structure, the liquid in the six suction pipes 3 connected via the connection pipe 18 can be sucked together by the pump 9.

Furthermore, a bubbling pipe 22 that jets bubbles to the hollow filter sheets 1 is connected to the bottom of the outer case 30. The bubbling pipe 22 has a large number of fine apertures 22a opened. When pressurized air is supplied to the bubbling pipe 22, the air is discharged from the apertures 22 to perform bubbling of fine bubbles in the liquid. In the shown filtration apparatus, the bubbling pipe 22 extending in a width direction of the hollow filter sheet 1 is horizontally provided at the bottom of the outer case 30. The bubbles jetted from the bubbling pipe 22 rise along the surfaces of the stacked hollow filter sheets 1 to be efficiently supplied to the whole surfaces of the respective hollow filter sheets 1. Alternatively, the filtration apparatus may also be provided with a bubbling pipe that extends in a stacked direction of the hollow filter sheets. In this filtration apparatus, for example, the plurality of bubbling pipes are provided apart from each other in the width direction of the hollow filter sheets. In that case, the bubbles can be efficiently supplied to the whole surfaces of the plurality of stacked hollow filter sheets. As shown in FIG. 4, the bubbling pipe 22 is connected to an air supply source 24 via a supply pipe 23. According to this structure, foreign matter deposited on the surfaces of the hollow filter sheets 1 can be removed by the bubbles.

In the above filtration apparatus, the first plate 31 and the second plate 32 of the outer case 30 are connected by the suction pipe 3, and then the hollow filter sheets 1 stacked via the ring-shaped packings 5 are clamped by the first plate 31 and the second plate 32. However, the hollow filter sheets stacked via the ring-shaped packings are not necessarily clamped by the first and second plates of the outer case in the filtration apparatus. The hollow filter sheets stacked via the ring-shaped packings may also be clamped directly by a clamp member connected to one end or both ends of the suction pipe in the filtration apparatus.

In a filtration apparatus shown in FIGS. 24 to 27, middle portions of the plurality of suction pipes 3 are connected to a suction portion 47, and the plurality of hollow filter sheets 1 are stacked on the suction pipes 3 projecting from both sides of the suction portion 47 via the ring-shaped packings 5. The suction portion 47 includes a plurality of connection blocks 48 each having the suction pipe 3 connected thereto, and a connection pipe 18 connecting these connection blocks 48. Since the shown filtration apparatus has six suction pipes 3, six connection blocks 48 are provided opposing to the six suction pipes 3 in the suction portion 47. That is, three connection blocks 48 are each provided vertically on both sides, and then, the connection pipe 18 connects these connection blocks 48.

A through hole 48A through which the suction pipe 3 is inserted is opened in the connection block 48. The suction pipe 3 is inserted through the through hole 48A to fix the middle portion of the suction pipe 3 to the connection block 48. Connection holes 48B are further opened in the connection block 48 in order to being connected with the connection pipe 18. The connection hole 48B communicates with the through hole 48A extending through the connection block 48, and therefore, liquid in the suction pipe 3 inserted through the through hole 48A can be sucked with the connection pipe 18 from a suction hole 43 opened in the suction pipe 3. Accordingly, the suction pipe 3 has the suction hole 43 opened at a location opposing the connection hole 48B. In the shown suction portion 47, the connection blocks 48 are vertically provided in three rows. The connection block 48 in a top row has the connection holes 48B opened in horizontal and downward directions, the connection block 48 in a middle row has the connection holes 48B opened in upward and downward directions, and further, the connection block 48 in a bottom row has the connection holes 48B opened in upward and horizontal directions. The connection pipe 18 is inserted into the connection holes 48B opened in the vertical and horizontal directions, thereby connecting the plurality of connection blocks 48 as a whole.

The connection pipe 18 includes vertical connection pipes 18X, each connecting the connection blocks 48 vertically adjacent to each other, and horizontal connection pipes 18Y in the top and bottom rows, each connecting the connection blocks 48 laterally adjacent to each other. In the vertical connection pipe 18X, an end thereof is inserted into and fixed to the connection hole 48B opened vertically in the connection block 48. In the horizontal connection pipe 18Y, an end thereof is inserted into and fixed to the connection hole 48B opened horizontally in the connection block 48. Further, the horizontal connection pipe 18Y connecting the connection blocks 48 located on the right and left in the top row is split in two at the middle, and then a branch block 49 is connected to a middle portion thereof. The extension pipe 19 is connected to the branch block 49, while the pump 9 is connected to the extension pipe 19. In order to connect the horizontal connection pipe 18Y and the extension pipe 19 in communication with each other, a horizontal connection hole 49A to which the horizontal connection pipe 18Y is connected, and a vertical connection hole 49B to which the extension pipe 19 is connected are opened in the branch block 49. The horizontal connection hole 49A communicates with the vertical connection hole 49B inside the branch block 49.

Further, as for the shown suction portion 48, support plates 44 are fixed to both surfaces of the plurality of connection blocks 48 provided vertically and horizontally. The support plate 44 may be, for example, a metal plate or a plastic plate. According to this structure, the plurality of connection blocks 48 and the branch block 49 can be connected more firmly as a whole. The suction portion, however, is not necessarily provided with the support plates on the both surfaces. Moreover, the suction portion may have plastic films attached on the both surfaces instead of the support plates.

Figure 24:
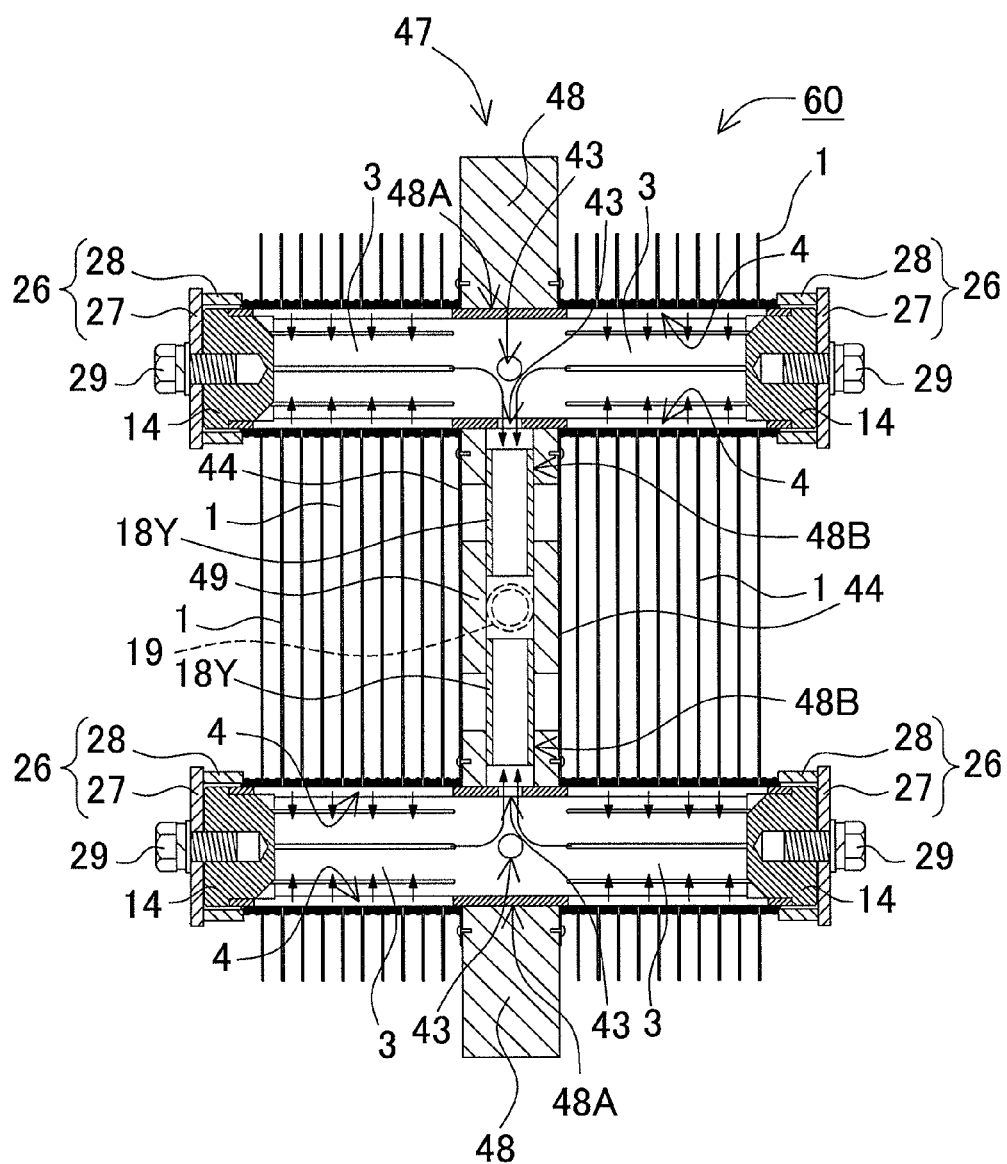
FIG. 24 is a horizontal sectional view of a filtration apparatus according to another embodiment of the present invention.
Figure 25:
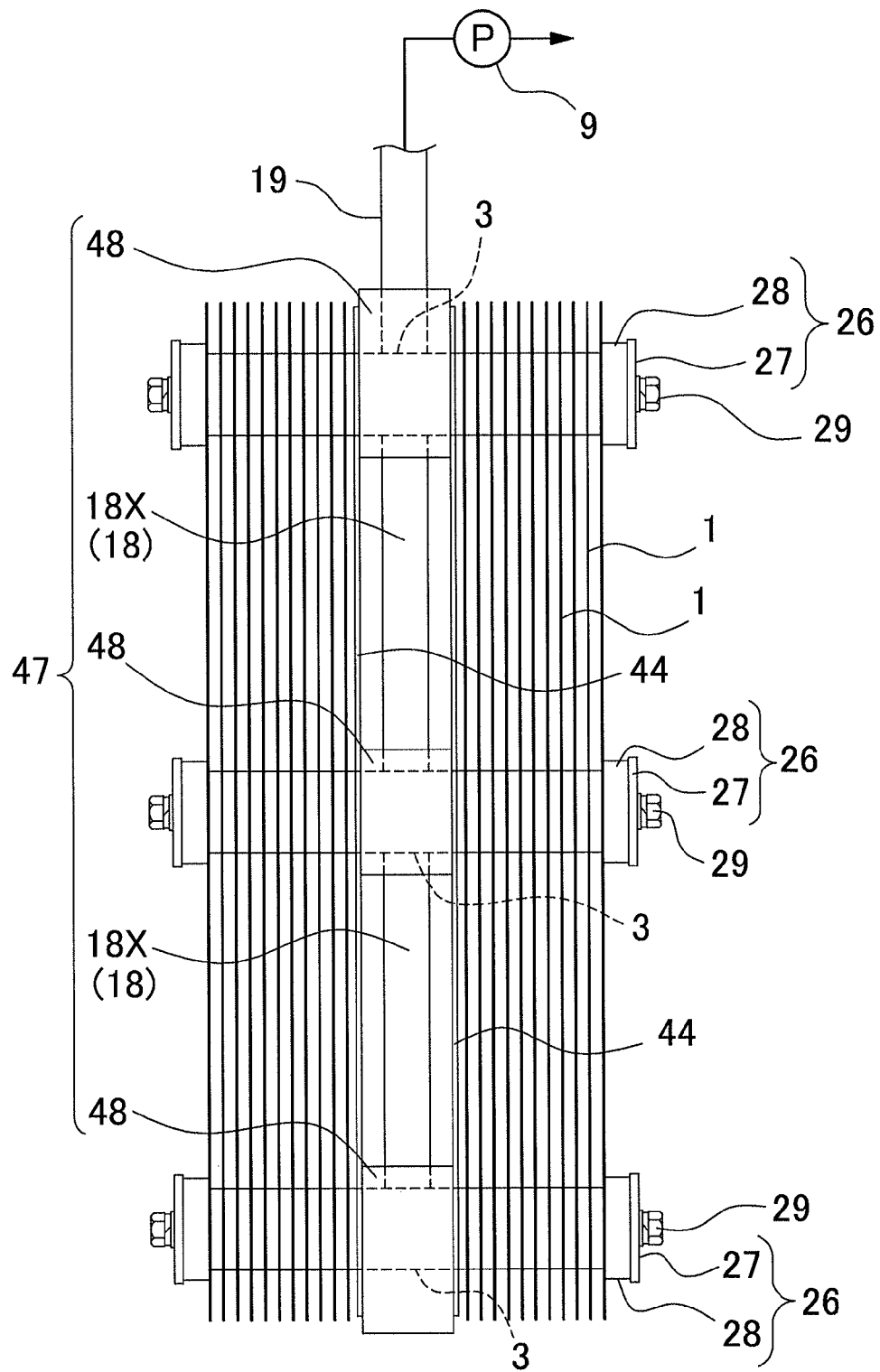
FIG. 25 is a vertical sectional view of the filtration apparatus in FIG. 24.
Figure 26:
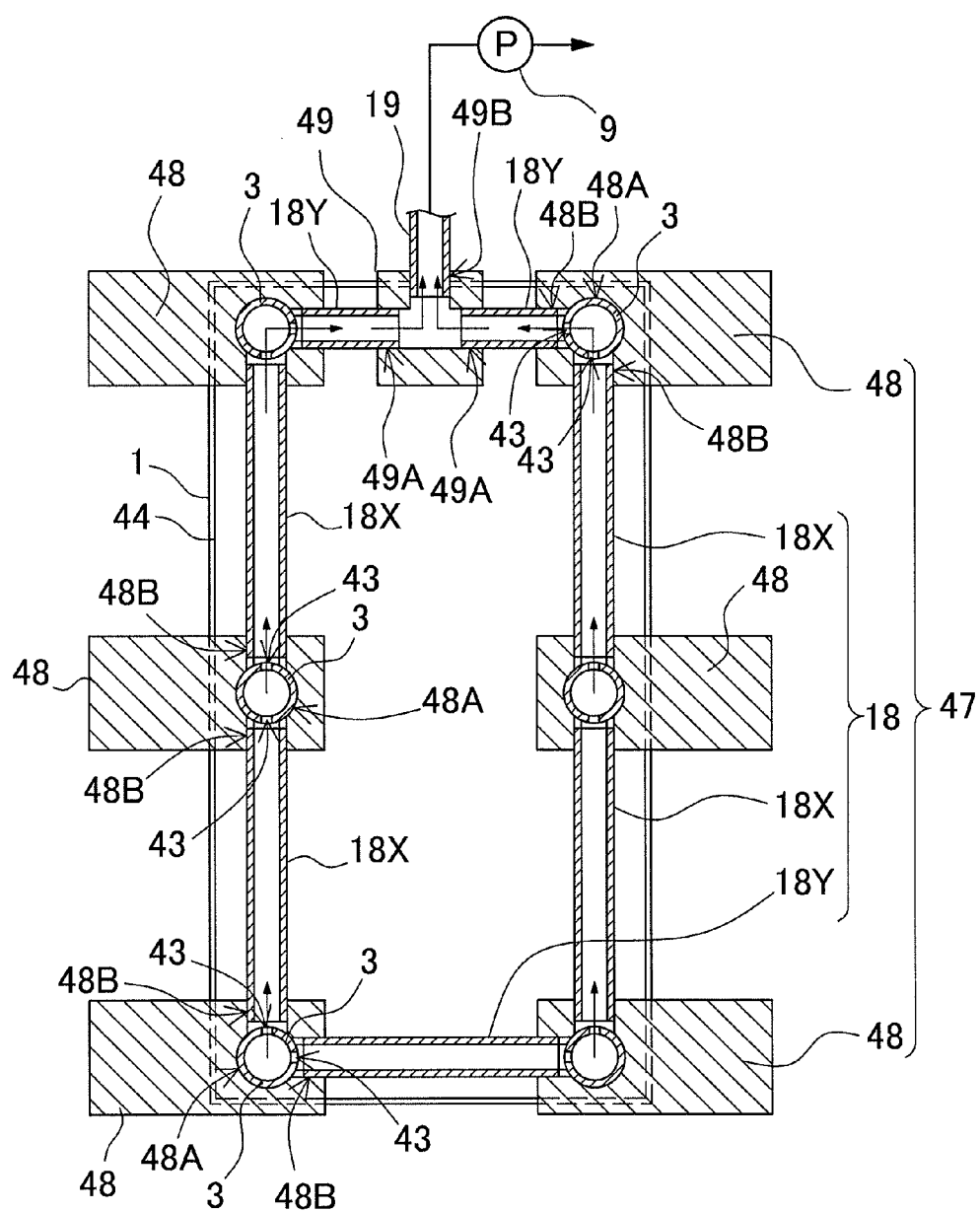
FIG. 26 is a side view of the filtration apparatus in FIG. 24.
Figure 27:
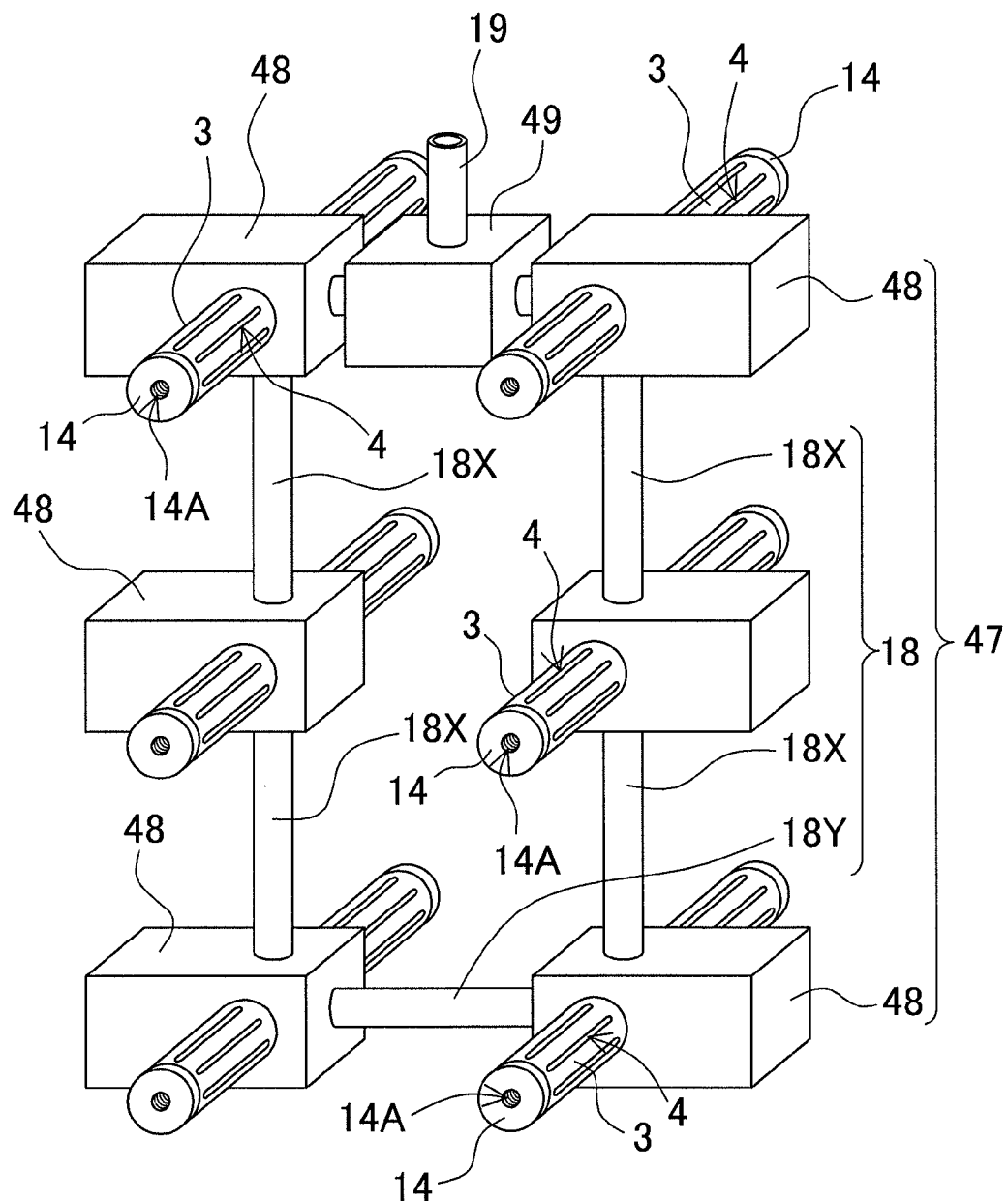
FIG. 27 is a schematic perspective view of a suction portion of the filtration apparatus in FIG. 24 showing a connection structure of connection blocks and connection pipes.

As shown in FIGS. 24 to 26, in the suction portion 47, the suction pipe 3 projecting from the both surfaces of the connection block 47 is inserted through the plurality of hollow filter sheets 1 stacked via the ring-shaped packings 5. Further, the clamp member 26 is fixed to the blocking portion 14 at an end of the suction pipe 3 via the set screw 29. The clamp member 26 is fixed by screwing the set screw 29 that passes through the support plate 27 in the blocking portion 14, and presses the ring-shaped packings 5 directly with the pressure ring 28 via the support plate 27 that is fixed to the suction pipe 3. A ring-shaped pressure plate may also be provided between the ring-shaped packing at the forefront of the suction pipe and the clamp member. The clamp member 26 fixed to the end of the suction pipe 3 presses the ring-shaped packing 5 at the forefront of the suction pipe 3 to cause the plurality of hollow filter sheets 1 stacked via the ring-shaped packings 5 to be in close contact with each other.

In the above suction portion 47, the plurality of suction pipes 3 communicate with each other via the connection blocks 48 and the connection pipe 18, while the connection pipe 18 is connected to the pump 9 via the branch block 49 and the extension pipe 19. The filtration apparatus sucks the liquid in the six suction pipes 3 connected via the connection pipe 18 and the connection blocks 48 together with the pump 9. According to this structure, a processing capacity of the filtration apparatus can be improved because the suction can be performed with one pump 9, while the plurality of hollow filter sheets 1 are stacked on the both surfaces of the suction portion 7.

In the filtration apparatus in FIGS. 24 to 27, one suction pipe 3 extends through the connection block 48 to stack the plurality of hollow filter sheets 1 on the projection portions from the both sides, and then the liquid inside the suction pipe 3 is sucked with the connection pipe 18 that is connected to the middle. According to this structure, a large number of hollow filter sheets 1 can be stacked with the number of the suction pipes 3 being reduced because the hollow filter sheets 1 are stacked on the both sides of one suction pipe 3. Alternatively, in the filtration apparatus, the above pipe, that is, the suction pipe with one end open is connected and fixed to each surface of the connection block, and then liquid inside each suction pipe can be sucked from the connection pipe by causing the liquid to pass through the through hole and the connection hole opened in the connection block. This filtration apparatus sucks the liquid in twelve suction pipes 3 in total connected to both sides of the connection blocks together with the pump.

Further, as shown in FIG. 28, the filtration apparatus may be provided with a filtration unit 60 obtained by stacking the plurality of hollow filter sheets 1 on both sides of the suction portion 47. Then, the plurality of filtration units 60 may be housed in an outer case 61. The outer case 61 has a total length and a width enough to house the plurality of filtration units 60 arranged in a plurality of rows. The outer case 61 in FIG. 28 houses three filtration units 60. In the outer case 61, three holding grooves 63 are provided on each of inner surfaces of side walls 62 on long sides and the holding grooves 63 face each other. Both sides of the suction portion 47, that is, outside projection portions of the connection blocks 48 provided on the both sides are fitted into the holding grooves 63, thereby allowing the filtration unit 60 to be located at a fixed position of the outer case 61. The filtration apparatus with this structure can be installed in an ideal state by variously adjusting the number of the filtration units 60 to be housed according to an installation location or a use, that is, a required processing capacity.

The filtration apparatus according to the present invention employs a hollow filter sheet. Even when a part of the hollow filter sheet is damaged, filtered objects such as suspended solid entering from this damaged part are effectively prevented from passing to a drainage side, and therefore, the filtration apparatus can be securely used for a long time.

The invention claimed is:

1. A filtration apparatus, comprising:
  a plurality of hollow filter sheets each obtained by stacking two filters and connecting outer peripheral edges thereof; and
  a suction pipe penetrating through the plurality of hollow filter sheets and connected to a hollow portion of each of the hollow filter sheets,
  wherein the filtration apparatus filters liquid by transferring, from the hollow portion of the hollow filter sheets to the suction pipe, liquid penetrating from an outside of the hollow filter sheets to an inside of the hollow portions,
  wherein the suction pipe includes at least one suction hole connected to the hollow portions of the hollow filter sheets,
  wherein each of the hollow filter sheets includes a through hole through which the suction pipe is inserted, the through holes having the suction pipe inserted therethrough, thereby connecting the plurality of hollow filter sheets to the suction pipe in a stacked manner,
  wherein ring-shaped packings are clamped between the stacked hollow filter sheets having the suction pipe inserted therethrough, respectively,
  wherein each of the ring-shaped packings has an inner shape allowing the suction pipe to be inserted therethrough and an outer shape longer than an inner shape of the through hole of each of the hollow filter sheets, the ring-shaped packings watertightly sealing a gap between the hollow filter sheets and the suction pipe,
  wherein each of the hollow filter sheets is provided with the hollow portion between the two filters, the hollow portion being provided with a spacer having a surface defining pits and projections, and
  wherein a narrow passage space allowing liquid to pass through and preventing impurities having a dimension larger than the narrow passage space present in fluid from passing therethrough when one of the hollow filter sheets is punctured, is provided between the filters and the spacer by pressing the two filters against surfaces of the spacer with the ring-shaped packings and causing the filters to be deformed into a shape according to the surfaces of the spacer, the narrow passage space being smaller than an uncompressed drainage space of 0.2 mm to 1 mm between the filters of each of the plurality of hollow filter sheets.

2. The filtration apparatus according to claim 1, wherein the spacer is any one of a net or a plate with a surface having pits and projections.

3. The filtration apparatus according to claim 1, wherein the spacer is a net, and a linear member of the net is a plastic fiber.

4. The filtration apparatus according to claim 1, wherein the spacer is a net, and a thickness of a linear member of the net is 80 to 250 μm.

5. The filtration apparatus according to claim 1, wherein the spacer is a net, and a mesh of the net of the spacer is 40 to 150.

6. The filtration apparatus according to claim 1, wherein the spacer is a plate that is provided with a plurality of projection portions on a surface thereof, thereby forming the pits and projections.

7. The filtration apparatus according to claim 1, wherein the spacer is a plate that is provided with a plurality of grooves extending vertically and horizontally on a surface thereof, thereby forming the pits and projections.

8. The filtration apparatus according to claim 1, wherein the spacer is obtained by arranging a plurality of linear members in a grid pattern and connecting intersection points to thereof.

9. The filtration apparatus according to claim 1, wherein, in each of the hollow filter sheets, the spacer itself is deformed so as to be squashed by a pressing force of the ring-shaped packings, causing the pits and projections on a surface of the spacer to be reduced in size, and then the narrow passage space smaller than the drainage space is formed.

10. The filtration apparatus according to claim 1, wherein each of the ring-shaped packings is a rubber elastic body.

11. The filtration apparatus according to claim 1, wherein each of the filters is a flexible sheet obtained by providing a filtration membrane on a surface of a nonwoven fabric.

12. The filtration apparatus according to claim 1, wherein a pressing force with respect to a unit length in a circumferential direction at the time of the ring-shaped packing pressing a surface of the filter is 1 to 6 kgf/cm.

13. The filtration apparatus according to claim 1, wherein the ring-shaped packing is an O-ring with a circular cross section.

14. The filtration apparatus according to claim 1, wherein, between adjacent hollow filter sheets, at least two of the ring-shaped packings are provided to clamp a ring-shaped spacer between the ring-shaped packings.

15. The filtration apparatus according to claim 1, wherein each of the ring-shaped packings is a ring with a quadrilateral cross section.

16. The filtration apparatus according to claim 1, wherein each of the ring-shaped packings is a cylindrical ring.

17. The filtration apparatus according to claim 1, wherein a first plate is provided on a first end of the suction pipe, and a second plate is provided on a second end of the suction pipe, and the first plate and the second plate are connected by the suction pipe, thereby fixing the plurality of stacked hollow filter sheets in a clamped manner.

18. The filtration apparatus according to claim 17, wherein the ring-shaped packing that is provided outside an outermost hollow filter sheet at the first end of the suction pipe and the ring-shaped packing that is provided outside an outermost hollow filter sheet at the second end of the suction pipe watertightly seal inner surfaces of the first plate and the second plate.

19. The filtration apparatus according to claim 17, wherein the plurality of hollow filter sheets are stacked in parallel with each other and are housed in an outer case, the outer case including the first plate and the second plate, which is comprised of a metal plate bent into a groove shape.

20. The filtration apparatus according to claim 17, wherein the first and second plates are formed of metal.

21. A filtration apparatus, comprising:
   a plurality of hollow filter sheets each obtained by stacking two filters and connecting outer peripheral edges thereof; and
   a suction pipe penetrating through the plurality of hollow filter sheets and connected to a hollow portion of each of the hollow filter sheets,
   wherein the filtration apparatus filters liquid by transferring, from the hollow portion of the hollow filter sheets to the suction pipe, liquid penetrating from an outside of the hollow filter sheets to an inside of the hollow portions,
   wherein the suction pipe includes at least one suction hole connected to the hollow portions of the hollow filter sheets,
   wherein each of the hollow filter sheets includes a through hole through which the suction pipe is inserted, the through holes having the suction pipe inserted therethrough, thereby connecting the plurality of hollow filter sheets to the suction pipe in a stacked manner,
   wherein ring-shaped packings are clamped between the stacked hollow filter sheets having the suction pipe inserted therethrough, respectively,
   wherein each of the ring-shaped packings has an inner shape allowing the suction pipe to be inserted therethrough and an outer shape longer than an inner shape of the through hole of each of the hollow filter sheets, the ring-shaped packings watertightly sealing a gap between the hollow filter sheets and the suction pipe,
   wherein a single piece of the suction pipe penetrates the hollow filter sheets and the ring-shaped packings,
   wherein each of the hollow filter sheets is provided with the hollow portion between the two filters, the hollow portion being provided with a spacer having a surface defining pits and projections, and
   wherein a narrow passage space allowing liquid to pass through is provided between the filters and the spacer by pressing the two filters against surfaces of the spacer with the ring-shaped packings and causing the filters to be deformed into a shape according to the surfaces of the spacer, the narrow passage space being smaller than a drainage space between the filters and the spacer that are not clamped by the ring-shaped packings.

* * * * *